United States Patent
Hiramitsu et al.

(10) Patent No.: US 7,199,710 B2
(45) Date of Patent: Apr. 3, 2007

(54) CONTROLLER FOR REMOTE CONTROL SYSTEM

(75) Inventors: Takayuki Hiramitsu, Aichi (JP);
Masayuki Kawamura, Aichi (JP);
Kiyokazu Ohtaki, Aichi (JP);
Yoshihito Mizuno, Aichi (JP);
Hiroyasu Hasegawa, Aichi (JP);
Daisuke Kawamura, Aichi (JP);
Toshikazu Mizutani, Aichi (JP);
Tomoyuki Funayama, Toyota (JP);
Teruya Tomiyasu, Toyota (JP); Koji Iwamoto, Aichi-ken (JP); Noriyasu Onishi, Aichi-ken (JP)

(73) Assignees: Kabushiki Kaisha Tokai Rika Denki, Achi (JP); Seisakusho & Toyota Jidosha Kabushiki, Aichi-Ken (JP)

( * ) Notice: Subject to any disclaimer, the term of this patent is extended or adjusted under 35 U.S.C. 154(b) by 168 days.

(21) Appl. No.: 10/858,843

(22) Filed: Jun. 2, 2004

(65) Prior Publication Data
US 2005/0020212 A1 Jan. 27, 2005

(30) Foreign Application Priority Data

Jun. 3, 2003 (JP) ............................. 2003-158553
Jun. 3, 2003 (JP) ............................. 2003-158555
Jun. 11, 2003 (JP) ............................. 2003-166662

(51) Int. Cl.
*G08B 1/08* (2006.01)

(52) U.S. Cl. .......................... 340/539.26; 340/426.28; 340/5.65; 341/173; 341/176; 235/470.01; 235/435

(58) Field of Classification Search ........... 340/539.26, 340/5.1, 5.2, 5.6, 5.65, 426.1, 426.24, 426.28, 340/5.72, 5.8; 341/173, 176; 307/10.1, 307/10.2; 235/435, 439, 472.01; 701/32, 701/36, 1

See application file for complete search history.

(56) References Cited

U.S. PATENT DOCUMENTS 6,484,260 B1 * 11/2002 Scott et al. ................. 713/186

(Continued)

FOREIGN PATENT DOCUMENTS

JP 2000-79868 3/2000

(Continued)

OTHER PUBLICATIONS

Japanese Office Action, pp. 1-3, dated Feb. 7, 2006.

*Primary Examiner*—Daniel Wu
*Assistant Examiner*—Daniel Previl
(74) *Attorney, Agent, or Firm*—Patterson, Thuente, Skaar & Christensen, P.A.

(57) ABSTRACT

A controller enabling switching between a smart function and an immobilizer function without using a key cylinder or a slot. The controller includes a verification ECU for transmitting a request signal to a first area and transmitting a transponder drive radio wave to a second area. The portable device transmits an ID code signal in response to the request signal or the transponder drive radio wave. The verification ECU enables the starting of an engine when the ID code transmitted from the portable device matches an ID code of the controller. The verification ECU transmits the drive radio wave when a driver operates a switch in a state in which the starting of the engine is not enabled after the request signal is transmitted.

32 Claims, 11 Drawing Sheets

U.S. PATENT DOCUMENTS 6,670,883 B1 * 12/2003 Asakura et al. ............ 340/5.61
6,850,153 B1 * 2/2005 Murakami et al. ....... 340/425.5
6,958,675 B2 * 10/2005 Maeda et al. .............. 340/5.61

FOREIGN PATENT DOCUMENTS

| JP | 2000079866 | | 3/2000 |
| JP | 2001-311333 | * | 4/2000 |
| JP | 2001-303807 | | 10/2001 |
| JP | 2001303807 | | 10/2001 |
| JP | 2001-311333 | * | 11/2001 |
| JP | 2002-029385 | * | 1/2002 |

* cited by examiner

Fig. 10

◆ Execution Time Setting Parameter

| Measurement Value | Setting Condition | Backup Control Execution Time Te | Normal Control Execution Time Ts | Ratio (Te:Ts) |
|---|---|---|---|---|
| ~ 1st Threshold Value | 1st Condition | 900 msec | 100 msec | 9:1 |
| 1st ~ 2nd Threshold Value | 2nd Condition | 700 msec | 300 msec | 7:3 |
| 2nd ~ 3rd Threshold Value | 3rd Condition | 500 msec | 500 msec | 5:5 |
| 3rd ~ 4th Threshold Value | 4th Condition | 300 msec | 700 msec | 3:7 |
| 4th ~ 5th Threshold Value | 5th Condition | 100 msec | 900 msec | 1:9 |
| 5th Threshold Value ~ | To 1st Mode | — | — | — |

1st Threshold Value = 20sec
2nd Threshold Value = 40sec
3rd Threshold Value = 60sec
4th Threshold Value = 80sec
5th Threshold Value = 120sec

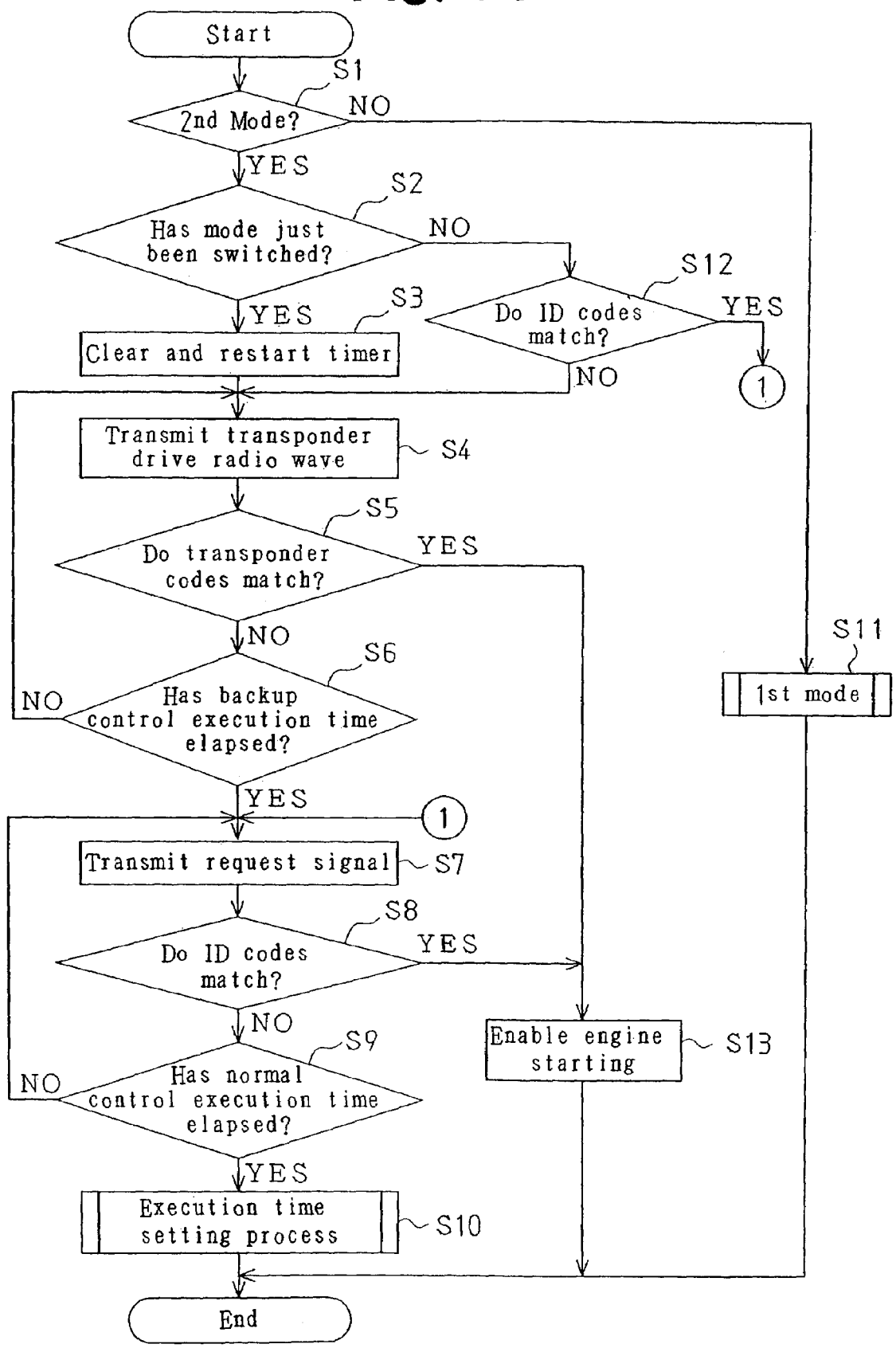

CONTROLLER FOR REMOTE CONTROL SYSTEM

BACKGROUND OF THE INVENTION

The present invention relates to a controller and a switch, and more particularly, to a controller and a switch for use in a smart key system of a vehicle.

A smart key system provided with a smart entry function and/or a smart ignition function as described in Japanese Laid-Open Patent Publication No. 2002-029385 has been proposed to improve security and convenience in an automobile. A portable device having the same ID code as that of an automobile is used for an automobile provided with a smart entry function and a smart ignition function. The portable device transmits a signal including the ID code to the automobile. In the automobile, a controller compares and verifies the ID code of the portable device with the ID code of the automobile. When the two ID codes match, the controller unlocks the door (smart entry) or enables the starting of the engine (smart ignition). More specifically, the smart entry function automatically unlocks the automobile door when the driver (user) who is carrying the portable device approaches the automobile. Further, the smart entry function automatically locks the door when the driver moves away from the automobile. The smart ignition function enables the controller of the automobile to start the engine when the driver enters the automobile while holding the portable device.

Accordingly, by using the smart functions (i.e., smart entry function and smart ignition function), the driver does not have to perform burdensome key operations when getting into or out of the vehicle and when starting the engine. This improves convenience. In addition, the door is not unlocked and the starting of the engine is not enabled unless the driver is carrying the portable device, which is extremely difficult to duplicate compared with a conventional mechanical key. This improves security.

The portable device, which realizes the smart function, uses a battery as a power source. When the battery is drained, communication cannot be performed between the portable device and the controller of the automobile. This invalidates the smart function. Thus, an immobilizer function is used in lieu of the smart ignition function when the battery of the portable device is drained. An immobilizer key having a key code that is the same as that of the automobile is used to realize the immobilizer function. An immobilizer key is a mechanical key including a transponder or a box-shaped portable device including a transponder. During usage of the immobilizer key, the controller of the automobile enables the starting of the engine when the key code of the immobilizer key matches the key code of the automobile and is thus verified.

More specifically, the transponder generates electromotive force when receiving electromagnetic waves of a predetermined intensity from the automobile. The electromotive force is used to transmit a signal including the key code to the automobile. In other words, the transponder functions without a power source.

When the battery of the portable device is drained, the immobilizer function is used in lieu of the smart function as described above. To use the immobilizer function, the driver inserts the immobilizer key in a key cylinder or a slot arranged in the automobile. When detecting the insertion of the immobilizer key, the controller of the automobile switches the smart function to the immobilizer function. In this structure, the arrangement of a key cylinder or a slot for receiving the immobilizer key increases cost and occupies space.

To solve this problem, the key cylinder or slot may be eliminated. However, the driver cannot use the immobilizer function without a trigger for switching the smart function to the immobilizer function. In other words, in the prior art, an automobile must have the key cylinder or slot to switch the communication control from normal control in which the smart function is valid to backup control in which the smart function is invalid.

Japanese Laid-Open Patent Publication No. 2001-311333 describes an engine control system provided with a smart ignition function. The engine control system includes a portable device rest and/or a portable device holder in the passenger compartment. The portable device rest or portable device holder includes a switch for detecting that the portable device is resting on the portable device rest or being held in the portable device holder. When the portable device is detected as being received by the rest or holder, communication control is switched from normal control in which the smart function is valid to backup control in which the smart function is invalid. This enables the driver to easily switch the communication control between normal control and backup control in accordance with the circumstances and increases the operability of the vehicle.

The communication area in which the portable device and the controller communicate with each other during backup control is normally much smaller than the communication area during normal control. Further, the switch may detect objects other than the portable device. Thus, in a state in which communication between the portable device and the controller is possible, when the communication control is switched from normal control to backup control even though the driver does not intend to do so, the driver may not be able to start the engine using the smart ignition function. That is, the arrangement of an object other than the portable device in the portable device rest or holder may switch the communication control from normal control to backup control even when the drive does not intend to do so. In such a case, the engine cannot be started since the necessary verification cannot be performed through communication between the portable device and the engine controller. This may mislead the driver into believing that the engine control system is not functioning properly.

The present invention provides a controller and a switch that enables the communication control to be switched from the smart function to the immobilizer function without using a key cylinder or a slot. Further, the present invention provides a controller that ensures the execution of ID verification through communication with a portable device.

SUMMARY OF THE INVENTION

One aspect of the present invention is a controller for communication with a portable device and connection to an activated apparatus and to an operation unit operable by a user to activate the activated apparatus. The controller includes a control unit for transmitting a request signal to a first area and a drive radio wave to a second area. The portable device transmits an ID code in response to the request signal or the drive radio wave, and the control unit enables activation of the activated apparatus when the ID code transmitted from the portable device matches an ID code of the controller. The control unit transmits the drive radio wave in a state in which the activation of the activated apparatus is not enabled after the request signal is transmitted when the operation unit undergoes an operation performed by the user.

Another aspect of the present invention is a controller for communication with a portable device and connection to an activated apparatus and to an operation unit operable by a user to activate the activated apparatus. The controller includes a control unit for transmitting a request signal to a first area and a drive radio wave to a second area. The portable device transmits an ID code in response to the request signal or the drive radio wave, and the control unit enables activation of the activated apparatus when the ID code transmitted from the portable device matches an ID code of the controller. The control unit transmits the drive radio wave when the user performs an operation on the operation unit that differs from the operation performed to activate the activated apparatus.

A further aspect of the present invention is a controller for communication with a portable device and connection to an activated apparatus and to an operation unit operable by a user to activate the activated apparatus. The controller includes a control unit for transmitting a request signal to a first area and a drive radio wave to a second area. The portable device transmits an ID code in response to the request signal or the drive radio wave, and the control unit enables activation of the activated apparatus when the ID code transmitted from the portable device matches an ID code of the controller. The control unit is connected to a switch that is separate from the operation unit and used to switch between transmission of the request signal and transmission of the drive radio wave.

A further aspect of the present invention is a switch connectable to a controller of an activated apparatus and used by a user to activate the activated apparatus. The controller communicates with a portable device, transmits a request signal to a first area, and transmits a drive radio wave to a second area. The portable device transmits an ID code in response to the request signal or the drive radio wave. The controller enables activation of the activated apparatus when the ID code transmitted from the portable device matches an ID code of the controller. The switch includes an operated member operable by the user and moved from a home position to a first switch position for activating the activated apparatus and moved from the home position to a second switch position for transmitting the drive radio wave from the controller.

A further aspect of the present invention is a control system for controlling an activated apparatus by communicating with a portable device of a user. The system includes a controller for communicating with the portable device, transmitting a request signal to a first area, and transmitting a drive radio wave to a second area. The portable device transmits an ID code in response to the request signal or the drive radio wave. The controller enables activation of the activated apparatus when the ID code transmitted from the portable device matches an ID code of the controller. A switch is connected to the controller. The switch includes an operated member operated by the user to activate the activated apparatus. The operated member is operated by the user and moved from a home position to a first switch position and from the home position to a second switch position. The controller activates the activated apparatus if activation is enabled when the operated member is located at the first switch position. The controller transmits the drive radio wave when the operated member is located at the second switch position.

A further aspect of the present invention is a method for activating an activated apparatus with a portable device, which transmits a first code in response to a request signal and a second code in response to a drive radio wave, and an operation unit, which is operated by a user. The method includes transmitting the request signal to a first area, comparing the first code, transmitted by the portable device in response to the request signal, with a third code, enabling the activation of the activated apparatus when the first code and the third code match, transmitting the drive radio wave to a second area when the first code and the third code do not match and the operation unit undergoes an operation performed by the user, comparing the second code, transmitted by the portable device in response to the drive radio wave, with a fourth code, and enabling the activation of the activated apparatus when the second code and the fourth code match.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 10 is a table showing execution time setting parameters set by a microcomputer incorporated in the controller shown in FIG. 8;

FIG. 11 is a flowchart showing a process executed in a second verification mode by the microcomputer of the controller shown in FIG. 8;

DETAILED DESCRIPTION OF THE PREFERRED EMBODIMENTS

Figure 1:
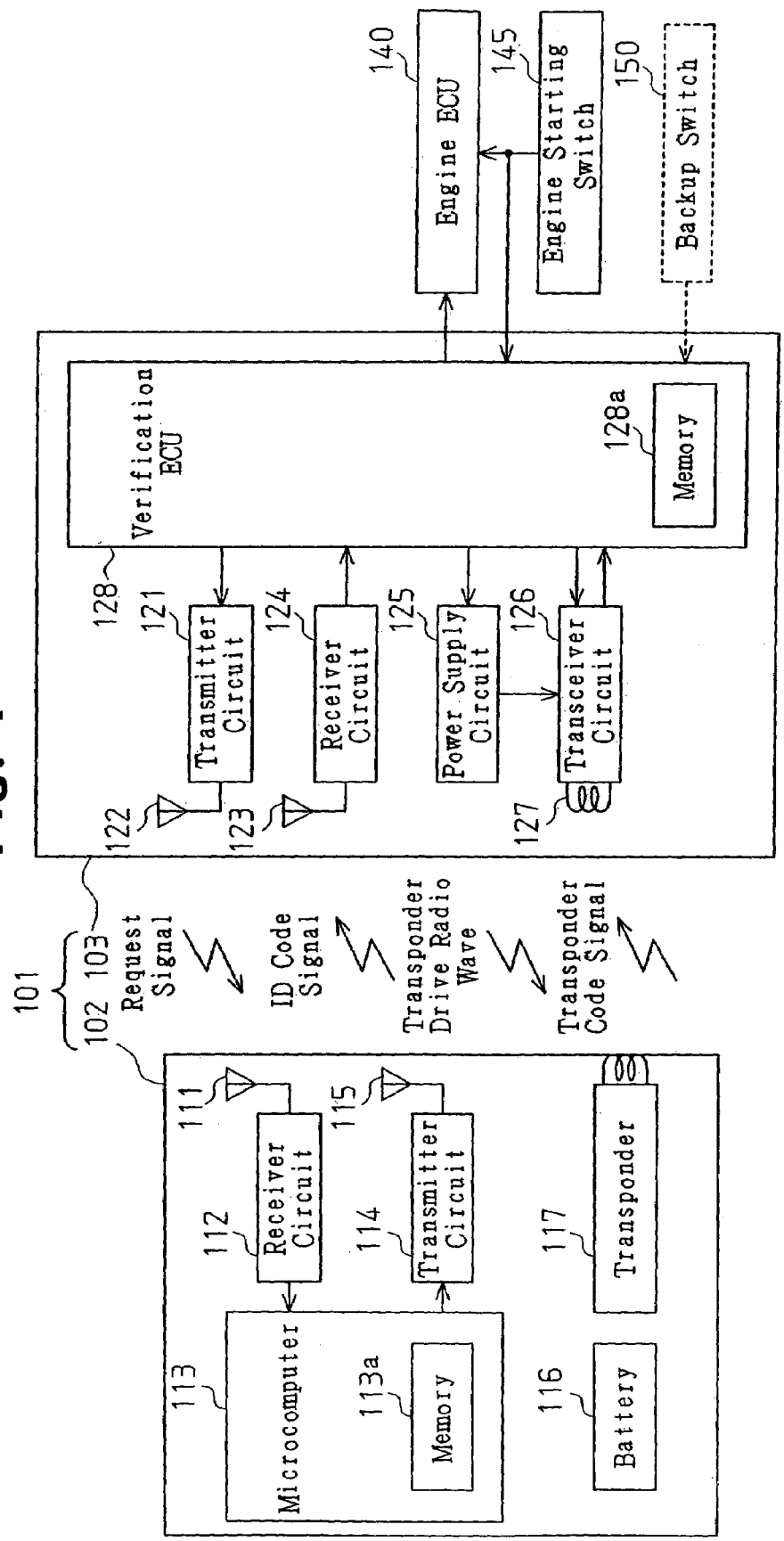
FIG. 1 is a schematic block diagram showing a remote control system including a controller according to a first embodiment of the present invention.

In the drawings, like numerals are used for like elements throughout.

A controller 103 of a remote control system 101 according to a first embodiment of the present invention will now be described.

Referring to FIG. 1, a remote control system 101 includes a portable device 102 and a controller 103. The portable device 102 transmits an ID code signal including an ID code and a transponder code signal including a transponder code. The controller 103 transmits a request signal and a transponder drive radio wave.

The portable device 102, which is carried by a driver (user), includes a receiver antenna 111, a receiver circuit 112, a microcomputer 113, a transmitter circuit 114, a transmitter antenna 115, a battery 116, and a transponder 117. The receiver circuit 112 receives a request signal from the controller 103 via a receiver antenna 111, demodulates the request signal to generate a received signal, and provides the received signal to the microcomputer 113. The microcomputer 113 includes a CPU, a ROM, and a RAM (none shown) in addition to a memory 113a. The memory 113a stores an ID code that is unique to the portable device 102 (ID codes differ between portable devices).

When receiving the received signal from the receiver circuit 112, the microcomputer 113 provides the transmitter circuit 114 with an output signal including an ID code to respond to the request signal. The transmitter circuit 114 modulates the output signal to a radio wave having a predetermined frequency (300 MHz in the first embodiment) and transmits the radio wave (ID code signal) via the transmitter antenna 115. The battery 116 functions as a power source for transmitting the ID code signal including the ID code in response to the request signal. The transponder 117 stores a transponder code unique to the transponder 117, or unique to the portable device 102 (transponder codes differ between portable devices). The transponder 117 receives a transponder drive radio wave from the controller 103 to generate electromotive force. Then, the transponder 117 uses the electromotive force to transmit a signal including the transponder code as a radio wave (transponder code signal) having a predetermined frequency (134 KHz in the first embodiment).

Figure 2:
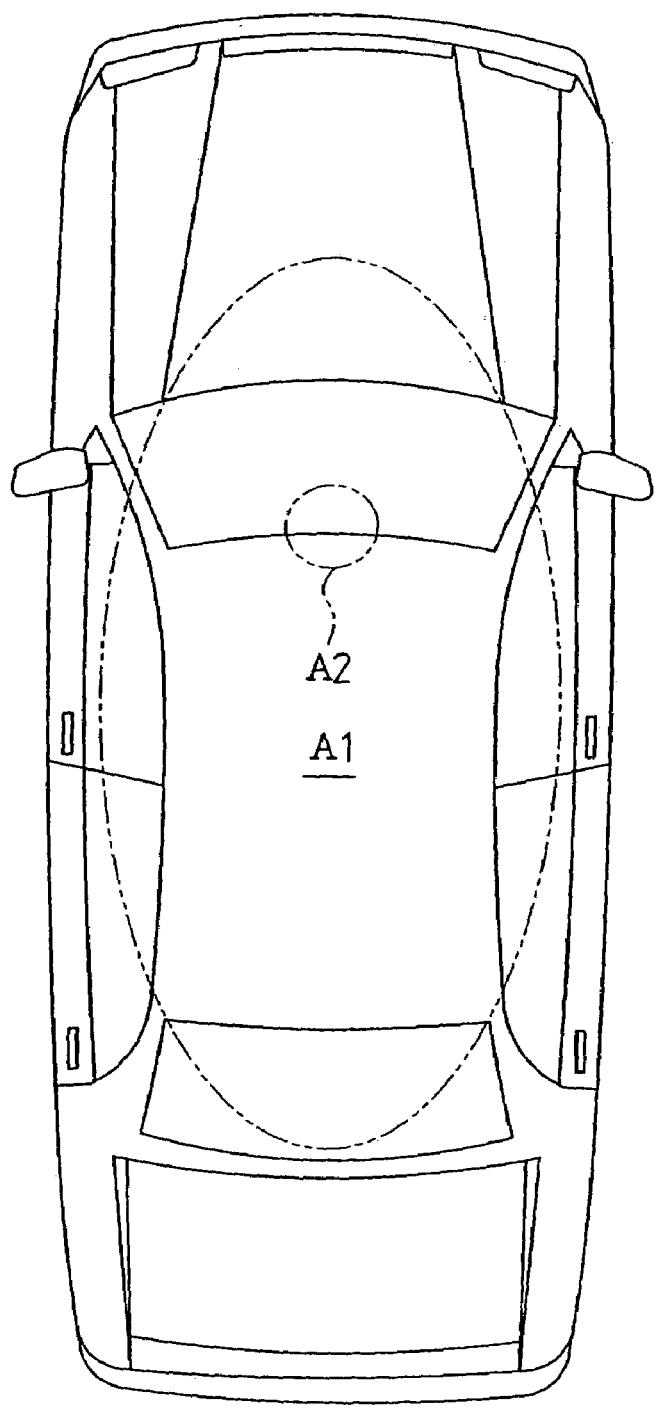
FIG. 2 is a diagram showing a first area and a second area in the first embodiment.

The controller 103, which is arranged in an automobile, includes a transmitter circuit 121, a transmitter antenna 122, a receiver antenna 123, a receiver circuit 124, a power supply circuit 125, a transceiver circuit 126, a transceiver antenna 127, and a verification ECU 128. The verification ECU 128 provides the transmitter circuit 121 with a request signal. The transmitter circuit 121 modulates the request signal received from the verification ECU 128 to a radio wave having a predetermined frequency (134 KHz in the first embodiment) and transmits the radio wave to a first area A1 (refer to FIG. 2) via the transmitter antenna 122. The first area A1 includes substantially the entire passenger compartment of the automobile. The receiver circuit 124 receives the signal including the ID code from the portable device 102 via the receiver antenna 123, demodulates the signal to generate a received signal, and provides the verification ECU 128 with the received signal.

The power supply circuit 125 supplies the transceiver circuit 126 with power. The transceiver circuit 126 uses the power supplied from the power supply circuit 125 to generate the transponder drive radio wave, which has a predetermined frequency (134 KHz in the first embodiment). Then, the transceiver circuit 126 transmits the transponder drive radio wave to a predetermined second area A2 (refer to FIG. 2) via the transceiver antenna 127. The second area A2 is much smaller than the first area A1. The second area A2 is preferably an area that can be reached by the driver when seated in the driver's seat, such as an area near the middle of the instrument panel. In the first embodiment, the second area A2 is defined in a range separated from the transceiver antenna 127 by 20 to 50 mm. The transceiver circuit 126 receives the transponder code signal from the portable device 102 via the transceiver antenna 127, demodulates the signal to generate a received signal, and provides the verification ECU 128 with the received signal.

Communication between the portable device 102 and the controller 103 is enabled in the first area A1 and the second area A2.

The verification ECU 128 includes a CPU, a ROM, and a RAM (none shown) in addition to a memory 128a. The memory 128a stores an ID code (ID code of the automobile), which is the same as that of the portable device 102, and a transponder code (transponder code of the automobile), which is the same as that of the portable device 102.

The verification ECU 128 selectively executes normal control, in which the request signal is transmitted to the first area A1, and backup control, in which the transponder drive radio wave is transmitted to the second area A2. That is, the verification ECU 128 switches communication controls.

When executing normal control, the verification ECU 128 transmits the request signal to the first area A1. Then, when receiving the received signal, which includes the ID code of the portable device 102, from the receiver circuit 124, the verification ECU 128 determines whether the ID code of the portable device 102 matches the ID code of the automobile (ID code verification). When executing backup control, the verification ECU 128 transmits the transponder drive radio wave to the second area A2. Then, when receiving the transponder code signal, which includes the transponder code of the portable device 102, from the transceiver circuit 126, the verification ECU 128 determines whether the transponder code of the portable device 102 matches the transponder code of the automobile (transponder code verification).

When the two ID codes match during the ID code verification or when the two transponder codes match during the transponder code verification, the verification ECU 128 provides an engine ECU 140 with an engine starting enabling signal (engine start enabling control).

An engine starting switch 145, which is a push button switch, is connected to the engine ECU 140. The engine starting switch 145 is operated and moved to an engine starting position to start the engine, which functions as an activated apparatus. If the engine starting switch 145 is moved to the engine starting position when the engine starting enabling signal is being provided from the verification ECU 128, the engine ECU 140 drives a starter motor (not shown) to start the engine. The engine starting switch 145 is connected to the verification ECU 128. The verification ECU 128 detects that the engine starting switch 145 has been moved to the engine starting position.

Figure 3:
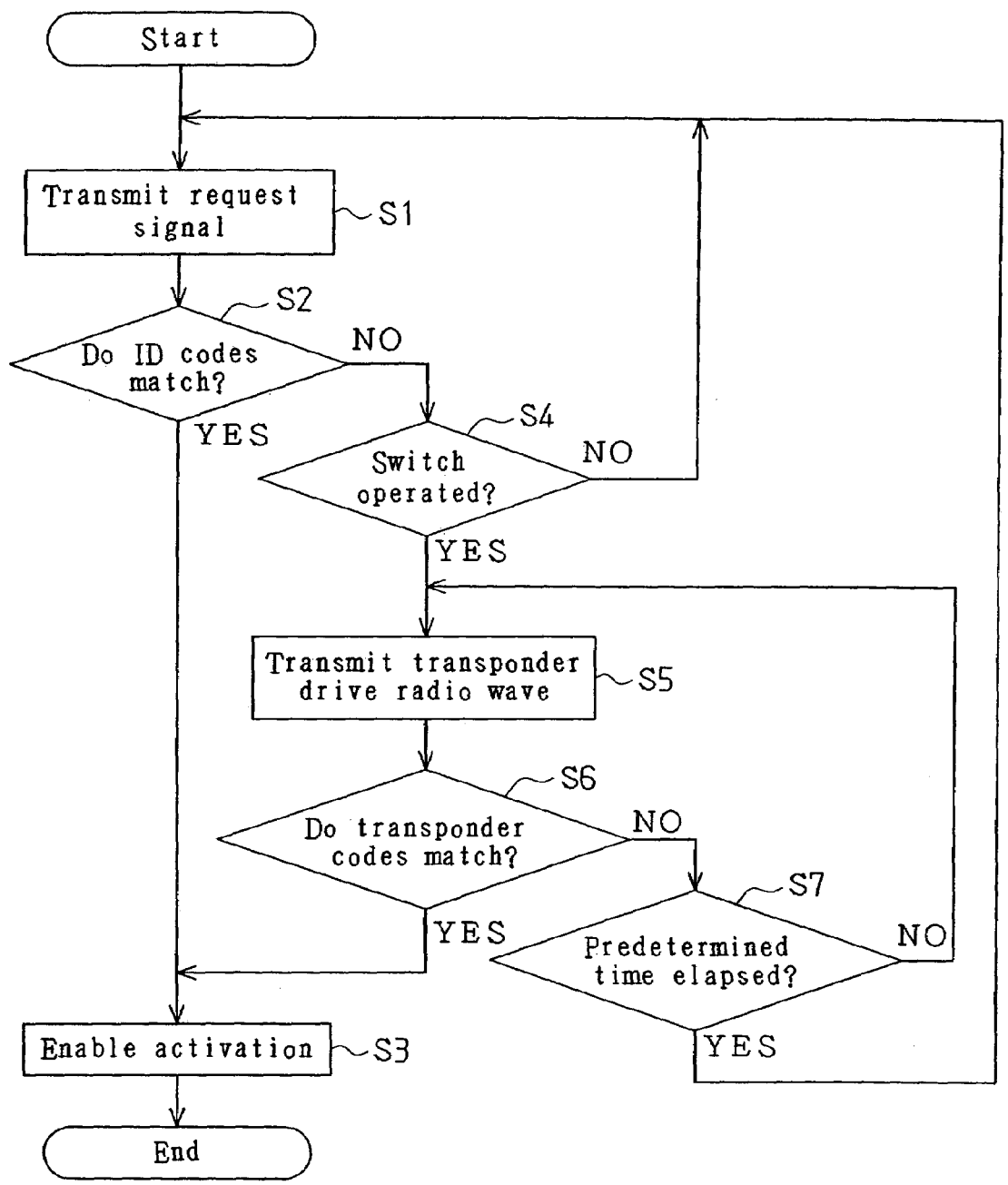
FIG. 3 is a flowchart showing a process for switching communication control that is executed by a verification ECU in the controller of FIG. 1.

The switching of communication controls that is performed by the verification ECU 128 will now be discussed with reference to the flowchart of FIG. 3.

The driver opens the driver's door, enters the automobile, and closes the door. A door courtesy switch (not shown) detects that the door has been opened and closed when the driver gets into the automobile and provides the verification ECU 128 with a detection signal. In response to the detection signal of the door courtesy switch, the verification ECU 128 executes normal control so that the transmitter circuit 121 intermittently transmits the request signal to the first area A1 (step S1). In other words, just by carrying the portable device 102 into the passenger compartment, the verification ECU 128 validates the smart ignition function that enables the starting of the engine. Thus, normal control is performed when the driver's door is opened and closed.

When the driver who is carrying the portable device 102 enters the passenger compartment, or the first area A1, the portable device 102 transmits an ID code signal, which includes a ID code, in response to a request signal of the controller 103. When receiving the ID code signal, the receiver circuit 124 provides the verification ECU 128 with a received signal, which includes the ID code.

The verification ECU 128 determines whether the ID code of the portable device 102, which is included in the received signal, matches the ID code of the automobile (step S2). When the two ID codes match (YES in step S2), that is, when the ID code of the portable device 102 is verified through communication during normal control in the first area A1, the verification ECU 128 provides the engine ECU 140 with an engine starting enabling signal (step S3). Then, the driver operates the engine starting switch 145, that is, pushes the engine starting switch 145 once to the engine starting position. As a result, the engine ECU 140 drives the starter motor (not shown) to start the engine. Normally, to start the engine, the brake must be activated and the gearshift lever must be located at the parking (P) position.

When the battery of the portable device 102 is drained, the ID code of the portable device 102 cannot be verified through communication during normal control even if the driver, who is carrying the portable device 102, enters the first area A1. Thus, the smart ignition function is invalidated (NO in step S2). However, the driver operates the engine starting switch 145 presuming that the smart entry function has enabled the starting of the engine. In other words, the driver operates the engine starting switch 145 regardless of whether or not communication is being performed through normal control. When the result of step S2 is NO, the verification ECU 128 then determines whether the engine starting switch 145 has been operated (step S4).

When the engine starting switch 145 is operated in a state in which the ID code of the portable device 102 is not verified through communication during normal control (YES in step S4), the verification ECU 128 controls the power supply circuit 125 and the transceiver circuit 126 to execute backup control, in which a transponder drive radio wave is transmitted to the second area A2 (step S5). Accordingly, if the starting of the engine is not enabled during normal control, the verification ECU 128 switches to backup control when the engine starting switch 145 is operated.

The driver recognizes that the smart ignition function is invalid due to battery drainage of the portable device 102 when the engine does not start even though the engine starting switch 145 is operated (YES in step S4). When the engine starting switch 145 is operated in a state in which the ID code of the portable device 102 is not verified through communication during normal control (YES in step S4), the controller 103 may issue a visual notification or an audible notification to notify the driver of the invalidation of the smart ignition function. When the smart ignition function is invalidated in this manner, the driver holds the portable device 102 in the second area A2. More specifically, the driver holds the portable device 102 over the middle of the instrument panel.

As a result, the transponder 117 of the portable device 102 receives a transponder drive radio wave from the controller 103 and generates electromotive force. The portable device 102 uses the electromotive force to transmit a transponder code signal including a transponder code. The transceiver circuit 126 receives the transponder code signal and provides the verification ECU 128 with a received signal, which includes the transponder code.

The verification ECU 128 determines whether the transponder code of the portable device 102 included in the received signal matches the transponder code of the automobile (step S6). When the two transponder codes match (YES in step S6), that is, when the transponder code of the portable device 102 is verified through communication during backup control in the second area A2, the verification ECU 128 provides the engine ECU 140 with the engine starting enabling signal (step S3). Then, when the driver operates and moves the engine starting switch 145 to the engine starting position, the engine ECU 140 drives the starter motor (not shown) and starts the engine.

In addition to a state in which the battery of the portable device 102 is drained, the ID code of the portable device 102 may not be verified, for example, when noise results in an accidental communication error. However, as soon as the noise is eliminated, the smart ignition function would most likely be validated. Thus, when normal control is switched to backup control (step S5) and the transponder code of the portable device 102 is verified through communication during backup control (YES in step S6), it is preferred that the communication control be returned to normal control from backup control after the starting of the engine is enabled (step S3). As long as the smart ignition function for normal control is valid, the driver may easily start the engine next time without having to hold the portable device in area A2.

If the transponder code of the portable device 102 cannot be verified during backup control (YES in step S7) before a predetermined time elapses (thirty seconds in the first embodiment) from after switching to backup control, the verification ECU 128 intermittently transmits a request signal to the first area A1 (step S1). That is, in such a case, the verification ECU 128 switches the communication control from backup control to normal control.

The controller 103 has the advantages described below.

(1) When the starting of the engine is not enabled during normal control, the verification ECU 128 switches the communication control from normal control to backup control when the engine starting switch 145 is operated. Accordingly, the driver may switch from normal control to backup control without having to insert a key in a key cylinder or a slot.

(2) Regardless of whether ID code verification is performed during normal control, the driver operates the engine starting switch 145. Thus, when ID code verification is not performed during normal control, the driver recognizes the invalidation of the smart ignition function when operating the engine starting switch 145. In other words, the driver does not become confused since the driver does not have to perform special operations that differ from normal operations. In this manner, operability is given top priority. Thus, the remote control system 101 has superior convenience.

(3) The conventional engine starting switch 145 is operated to switch the communication mode. Thus, a separate switch for switching the communication control is not necessary. Accordingly, the quantity of components in the automobile is not increased.

(4) As described in advantage (1), a key cylinder or a slot is not necessary. This decreases the number of components of the automobile and is meritorious in terms of cost and space.

(5) The request signal is transmitted to the first area A1 during normal control, and the transponder drive radio wave is transmitted to the second area A2, which is smaller than the first area A1, during backup control. It is easier for the driver to hold the portable device 102 in the large first area A1 to verify the portable device ID code through communication during normal control than to hold the portable device 102 in the small second area A2 to verify the portable device transponder code during backup control. Thus, after a predetermined time elapses from when the communication control is switched to backup control to verify the portable device transponder, the communication control is shifted back to normal control from backup control. In this manner, priority is given to normal control to improve convenience.

A controller 203 and an engine starting switch 240 of a remote control system 201 according to a second embodiment of the present invention will now be discussed.

Figure 4:
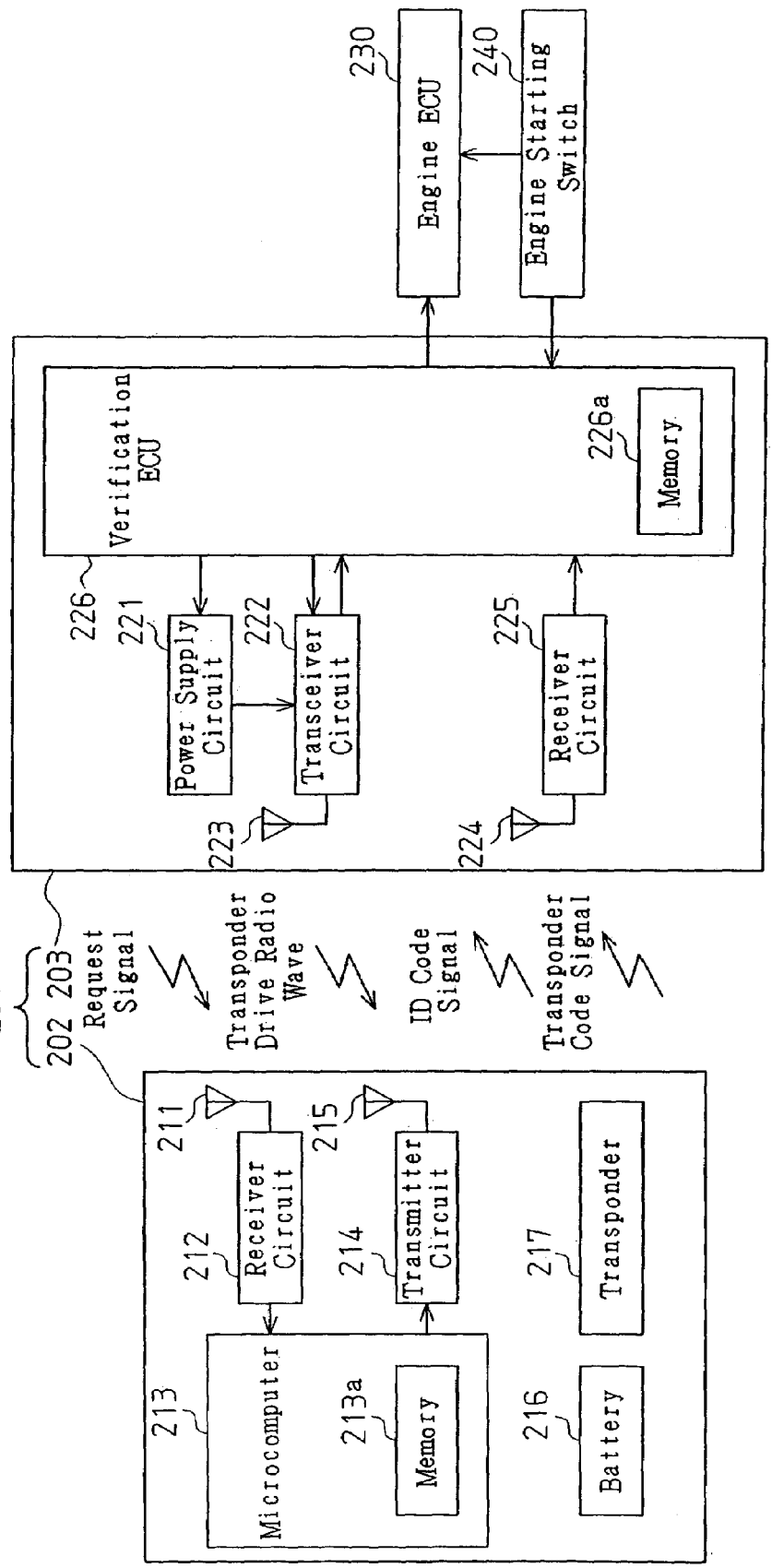
FIG. 4 is a schematic block diagram showing a remote control system including an engine starting switch according to a second embodiment of the present invention.

Referring to FIG. 4, the remote control system 201 includes a portable device 202 and the controller 203. The structure of the portable device 202 is the same as the portable device 102 of the first embodiment.

Figure 5:
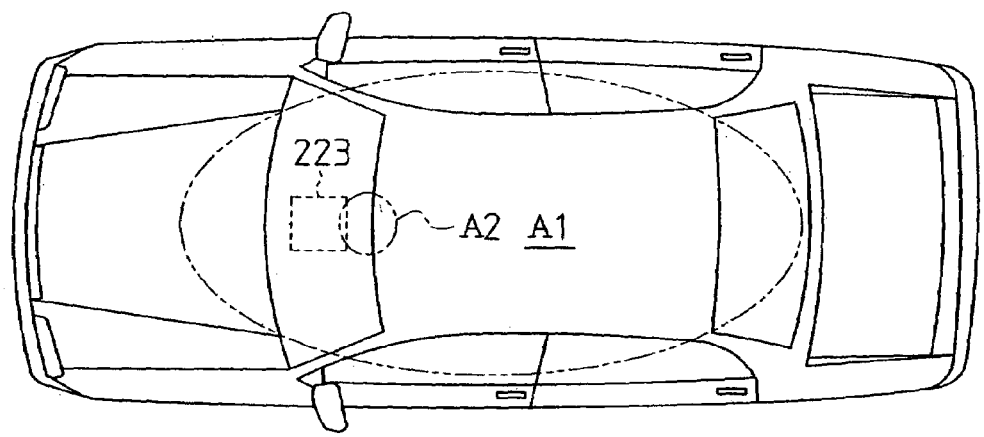
FIG. 5 is a diagram showing a first area and a second area in the second embodiment.

The controller 203, which is installed in an automobile, includes a power supply circuit 221, a transceiver circuit 222, a transceiver antenna 223, a receiver antenna 224, a receiver circuit 225, and a verification ECU 226. The transceiver circuit 222 modulates a request signal, which is provided from the verification ECU 226, to a radio wave having a predetermined frequency (134 KHz in the second embodiment) and transmits the radio wave to a predetermined first area A1 via the transceiver antenna 223. Referring to FIG. 5, the transceiver antenna 223 is located in the middle of an instrument panel. The transceiver circuit 222 transmits the request signal to the first area A1 via the transceiver antenna 223. The first area A1 includes substantially the entire passenger compartment of the automobile.

The transceiver circuit 222 uses the power supplied from the power supply circuit 221 to generate a transponder drive radio wave having a predetermined frequency (134 KHz in the second embodiment). The transceiver circuit 222 then transmits the transponder drive radio wave to a predetermined second area A2 via the transceiver antenna 223. In the second embodiment, the second area A2 is defined in a range separated from the transceiver antenna 223 by 0.1 to 0.2 m.

When receiving a transponder code signal from the portable device 202 via the transceiver antenna 223, the transceiver circuit 222 demodulates the transponder code signal to generate a received signal and provides the received signal to the verification ECU 226. When receiving an ID code signal from the portable device 202 via the receiver antenna 224, the receiver circuit 225 demodulates the ID code signal to generate a received signal and provides the received signal to the verification ECU 226. Communication is performed between the portable device 202 and the controller 203 in the first area A1 and the second area A2.

The verification ECU 226 includes a CPU, a ROM, and a RAM (none shown) in addition to a memory 226a. The memory 226a stores an ID code (ID code of the automobile) that is the same as the ID code of the portable device 202 and a transponder code (transponder code of the automobile) that is the same as the transponder code of the portable device 202.

When receiving the received signal that includes the ID code from the receiver circuit 225, the verification ECU 226 determines whether the ID code of the portable device 202 matches the ID code of the automobile (ID code verification). Further, when receiving the received signal that includes the transponder code from the transceiver circuit 222, the verification ECU 226 determines whether the transponder code of the portable device 202 matches the transponder code of the automobile (transponder code verification).

The verification ECU 226 provides an engine ECU 230 with an engine starting enabling signal when the two ID codes match during ID code verification or when the two transponder codes match during transponder code verification (engine starting enabling control).

A first operation is performed on an engine starting switch 240 to start the engine. The first operation moves the engine starting switch 240 to an engine starting position. If the engine starting switch 240 is moved to the engine starting position when the engine starting enabling signal is being provided from the verification ECU 226, the engine ECU 230 drives a starter motor (not shown) to start the engine.

A second operation is performed on the engine starting switch 240 to execute backup control. The second operation moves the engine starting switch 240 to a backup control position. The engine starting switch 240 is connected to the verification ECU 226. Accordingly, the verification ECU 226 detects the movement of the engine starting switch 240 to the backup control position. When the engine starting switch 240 is moved to the backup control position, the verification ECU 226 switches the communication control from normal control, in which the request signal is transmitted to the first area A1, to backup control, in which the transponder drive radio wave is transmitted to the second area A2.

Figure 6:
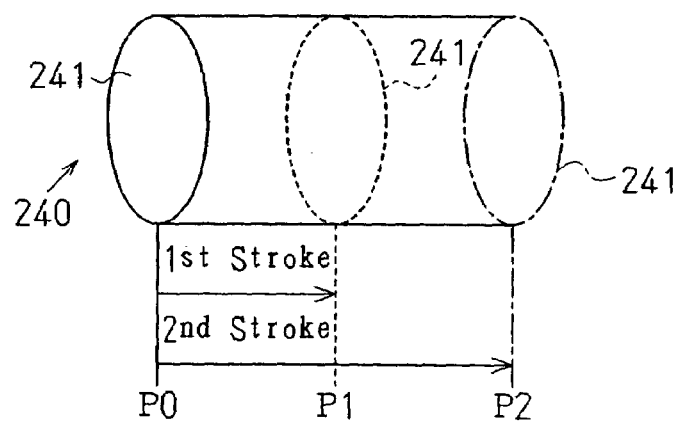
FIG. 6 is a schematic diagram showing the engine starting switch of FIG. 4.

The structure of the engine starting switch 240 will now be discussed with reference to FIG. 6.

The engine starting switch 240 of the second embodiment is a push button switch and includes a push button (operated member) 241, which is pushed by the driver. The driver pushes and moves the push button 241 in a first stroke from a home position P0 to an engine starting position P1 (first operation). Further, the driver pushes and moves the push button 241 in a second stroke, which is longer than the first stroke, from the home position P0 to a backup control position P2 (second operation). The engine starting switch 240 is provided with a return function in which the push button 241 returns to the home position P0 from the engine starting position P1 or the backup control position P2 when the driver releases the push button 241.

The operation for starting the engine will now be discussed.

When the driver enters the automobile, the verification ECU 226 controls the transceiver circuit 222 to intermittently transmit the request signal to the first area A1. In other words, the verification ECU 226 performs normal control. In response to the request signal, the portable device 202 transmits an ID code signal, which includes an ID code. The receiver circuit 225 receives the ID code signal and provides the verification ECU 226 with a received signal, which includes the ID code of the portable device 202. The verification ECU 226 determines whether the ID code of the portable device 202 matches the ID code of the automobile.

When the portable device 202 held by the driver corresponds with the automobile, the ID code of the portable device 202 matches the ID code of the automobile. In this case, the verification ECU 226 provides the engine ECU 230 with the engine starting enabling signal. When the two ID codes match during the ID code verification, that is, when the ID code of the portable device 202 is verified through communication during normal control, the smart ignition function is validated to enable the starting of the engine.

In this manner, when the starting of the engine is enabled, the driver pushes the push button 241 of the engine starting switch 240 in the first stroke from the reference position P0. This moves the engine starting switch 240 to the engine starting position P1. As a result, the engine ECU 230 drives the starter motor (not shown) and starts the engine. Then, when the driver releases the push button 241, the return function automatically returns the push button 241 to the home position P0 from the engine starting position P1.

When the battery of the portable device 202 is drained, the ID code of the portable device 202 is not verified through communication during normal control even when the driver is in the first area A1 while holding the portable device 202. Thus, the smart ignition function is invalidated. In this case, the engine does not start even when the driver moves the engine starting switch 240 to the engine starting position P1. Therefore, the driver pushes the engine starting switch 240 in the second stroke from the reference position P0 to move the engine starting switch 240 to the backup control position P2. When the driver releases the push button 241, the return function automatically returns the push button 241 from the backup control position P2 to the home position P0.

Then, the verification ECU 226 controls the power supply circuit 221 and the transceiver circuit 222 so that the transceiver circuit 222 transmits a transponder drive radio wave to the second area A2. In other words, the verification ECU 226 performs backup control. In this manner, the verification ECU 226 switches from normal control to backup control when the engine starting switch 240 is moved to the backup control position P2.

The driver then holds the portable device 202 in the second area A2. More specifically, the driver holds the portable device 202 over the middle of the instrument panel. As a result, the portable device 202 transmits a transponder code signal, which includes the transponder code. The verification ECU 226 then determines whether the transponder code of the portable device 202 matches the transponder code of the automobile.

When the portable device 202 carried by the driver corresponds to the automobile, the transponder code of the portable device 202 matches the transponder code of the automobile. Thus, the verification ECU 226 provides the engine ECU 230 with the engine starting enabling signal. In this manner, the starting of the engine is enabled when the two transponder codes match during the transponder code verification, that is, when the transponder code is verified through communication during backup control.

When the starting of the engine is enabled in this manner, the driver pushes the push button 241 of the engine starting switch 240 from the home position P0 in the first stroke. This moves the engine starting switch 240 to the engine starting position P1. As a result, the engine ECU 230 drives the starter motor (not shown) to start the engine. Then, when the driver releases the push button 241, the return function automatically returns the push button 241 to the home position P0 from the engine starting position P1.

The engine starting switch 240 of the second embodiment has the advantages described below.

(1) The driver pushes the push button 241 of the engine starting switch 240 in the first stroke from the home position P0 to the engine starting position P1. Further, the driver pushes the push button 241 in the second stroke from the home position P0 to the backup control position P2. This engine starting switch 240 is employed in the remote control system 201. Accordingly, the verification ECU 226 switches from normal control to backup control when the push button 241 of the engine starting switch 240 is moved to the backup control position P2. Thus, the second embodiment differs from the prior art in that an immobilizer key or slot is not necessary to switch the communication control from normal control to backup control. Accordingly, the engine starting switch 240 is optimal for the remote control system 201 that switches communication control between normal control and backup control without using an immobilizer key or a slot.

(2) When the driver releases the push button 241, the return function automatically returns the push button to the home position P0 from the engine starting position P1 or the backup control position P2. Thus, the driver does not have to perform any operation to return the push button 241 to the home position P0 from the engine starting position P1 or the backup control position P2. Accordingly, operability for starting the engine is improved.

An engine starting switch 240 according to a third embodiment of the present invention will now be described.

The structures of the portable device and the controller in the third embodiment are the same as the structures of the portable device 202 and the controller 203 in the second embodiment.

Figure 7:
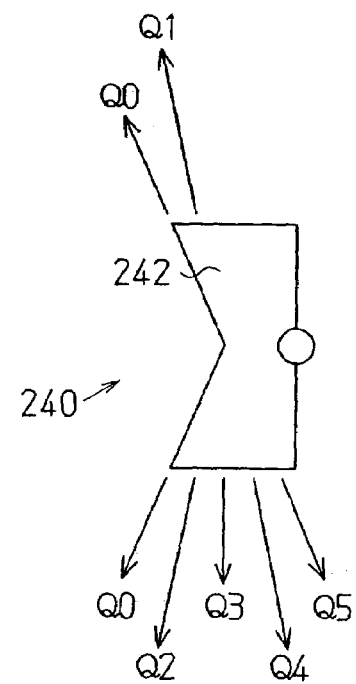
FIG. 7 is a schematic diagram showing an engine starting switch according to a third embodiment of the present invention.

Referring to FIG. 7, the engine starting switch 240 of the third embodiment is a seesaw switch including a button 242 that may be inclined by the driver from a home position Q0 in a first direction or a second direction. When the driver inclines the button 242 in the first direction from the home position Q0, the engine starting switch 240 is moved to an engine starting position Q1. The engine starting switch 240 is provided with a return function that returns the button 242 from the engine starting position Q1 to the home position Q0 when the driver releases the button 242.

When the driver inclines the button 242 by one step in the second direction from the home position Q0, the engine starting switch 240 is moved to a backup control position Q2. The button 242 does not return to the home position Q0 from the backup control position Q2 even if the driver releases the button 242. The button 242 is held at the backup control position Q2 until the driver moves the button 242 again.

If the driver further inclines the button 242 by one step in the second direction from the backup control position Q2, or two steps in the second direction from the home position Q0, the engine starting switch 240 is moved to an accessory position Q3. The button 242 does not return to the backup control position Q2 from the accessory position Q3 even if the driver releases the button 242. The button 242 is held at the accessory position Q3 until the driver moves the button 242 again. Accessories, such as a car stereo, are supplied with power when the button 242 is located at the accessory position Q3.

If the driver further inclines the button 242 by one step in the second direction from the accessory position Q3, or three steps in the second direction from the home position Q0, the engine starting switch 240 is moved to an ignition position Q4. The button 242 does not return to the accessory position Q3 from the ignition position Q4 even if the driver releases the button 242. The button 242 is held at the ignition position Q4 until the driver moves the button 242 again. In addition to accessories, electric devices, such as an air conditioner, are supplied with power when the button 242 is located at the ignition position Q4.

If the driver further inclines the button 242 by one step in the second direction from the ignition position Q4, or four steps in the second direction from the home position Q0, the engine starting switch 240 is moved to an engine starting position Q5. The button 242 is provided with a return function that returns the button 242 to the ignition position Q4 from the starting position Q5 when the driver releases the button 242. The button 242 is held at the ignition position Q4 until the driver moves the button 242 again. Since the verification of the portable device 202 through backup control has enabled the starting of the engine, the button 242 starts the engine at the engine starting position Q5.

The operation for starting the engine will now be discussed.

When the smart ignition function is validated and the starting of the engine is enabled in the same manner as the second embodiment, the driver inclines the button 242 of the engine starting switch 240 in the first direction from the home position Q0. This moves the engine starting switch 240 to the engine starting position Q1 and starts the engine. Then, when the driver releases the button 242, the return function automatically returns the button 242 to the home position Q0 from the engine starting position Q1.

The smart ignition function is invalidated when the battery of the portable device 202 is drained. Therefore, the engine is not started even when the driver moves the engine starting switch 240 to the engine starting position Q1. In such a case, the driver inclines the button 242 of the engine starting switch 240 by one step in the second direction from the home position Q0. This moves the engine starting switch 240 to the backup control position Q1. The verification ECU 226 switches the communication control from normal control to backup control when the engine starting switch 240 is moved to the backup control position Q2. When the portable device transponder code is verified during backup control, the starting of the engine is enabled.

When the starting of the engine is enabled, the driver inclines the button 242 of the engine starting switch 240 by three steps in the second direction from the backup control position Q2. This moves the engine starting switch 240 to the engine starting position Q5 and starts the engine. Then, when the driver releases the button 242, the return function automatically returns the button 242 from the engine starting position Q5 to the ignition position Q4. The button 242 is held at the ignition position Q4.

The engine starting switch 240 of the third embodiment has the advantages described below.

(1) When the driver inclines the button 242 in the first direction from the home position Q0, the engine starting switch 240 is moved to the engine starting position Q1. When the driver inclines the button 242 by one step in the second direction from the reference position Q0, the starting switch 240 is moved to the backup control position Q2. This engine starting switch 240 is employed in the remote control system 201. Thus, the verification ECU 226 is switched from normal control to backup control when the engine starting switch 240 is moved to the backup control position Q2. The third embodiment differs from the prior art in that an immobilizer key or slot is not necessary to switch the communication control from normal control to backup control. Accordingly, the engine starting switch 240 is optimal for the remote control system 201 that switches the communication control between normal control and backup control without using an immobilizer key or a slot.

(2) When the driver releases the button 242 at the engine starting position Q1, the return function automatically returns the button 242 to the home position Q0 from the engine starting position Q1. Thus, the driver does not have to perform any operation to return the button 242 to the home position Q0 from the engine starting position Q1. Accordingly, operability for starting the engine is improved.

(3) In addition to the engine starting position Q1, the engine starting switch 240 may be moved to the further engine starting position Q5. The engine starting switch 240 starts the engine at the engine starting position Q1 if the starting of the engine is enabled when the portable device ID code is verified through communication during normal control. The engine starting switch 240 starts the engine at the engine starting position Q5 if the starting of the engine is enabled when the portable device transponder code is verified through communication during backup control. When the button 242 is moved by one step in the second direction from the home position Q0, the engine starting switch 240 is moved to the backup control position Q2. The button 242 is then further inclined by three steps in the second direction to move the engine starting switch 240 to the engine starting position Q5. In this manner, the direction in which the button 2.42 of the engine starting switch 240 is inclined from the home position Q0 to the backup control position Q2 is the same as the direction in which the button 242 is inclined from the backup control position Q2 to the engine starting position Q5. Accordingly, when the smart ignition function is invalidated, the driver moves the button 242 only in the second direction to start the engine. This improves operability for starting the engine.

A controller 321 of a vehicle engine control system 301 according to a fourth embodiment of the present invention will now be discussed.

Figure 8:
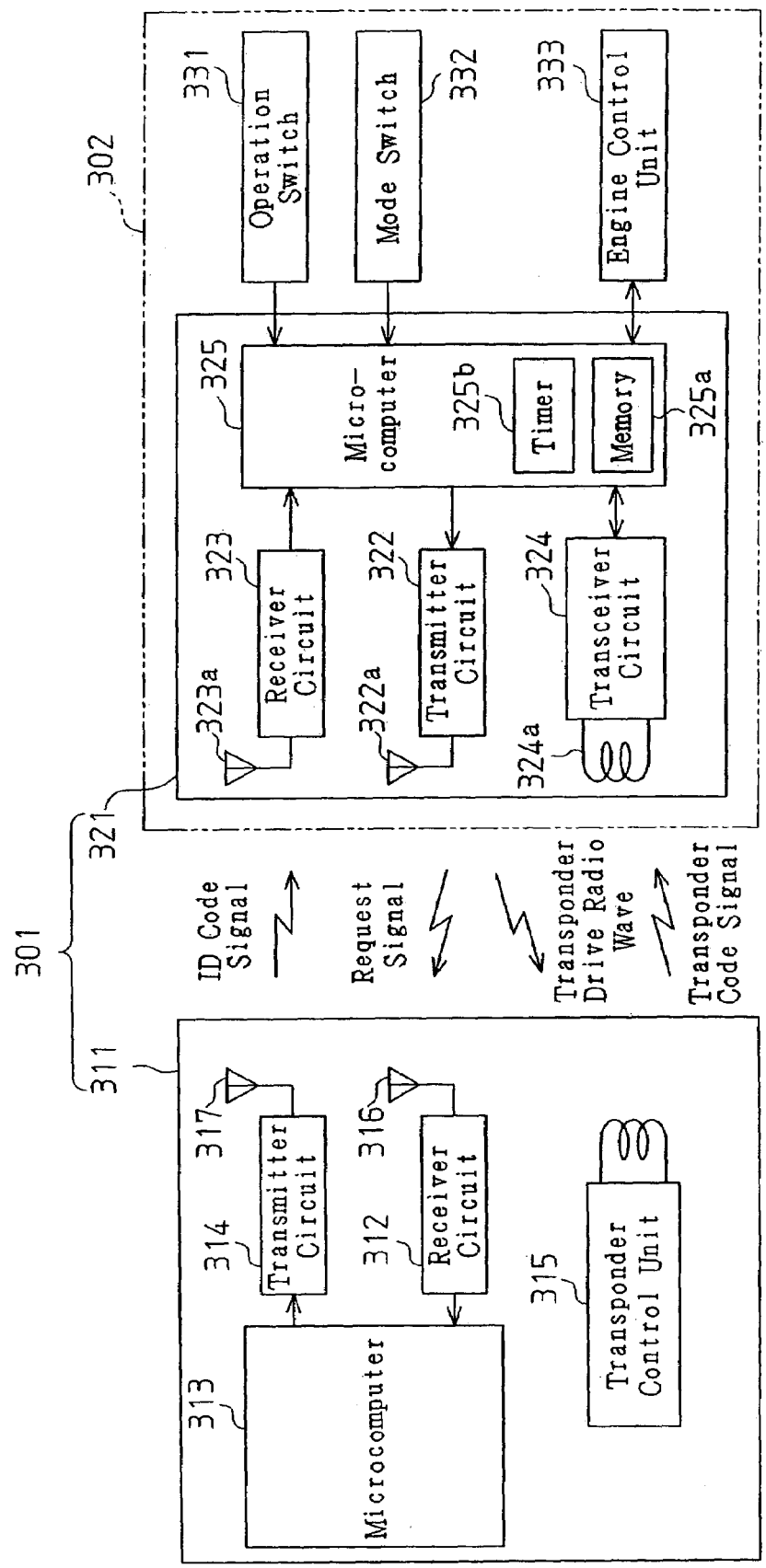
FIG. 8 is a schematic block diagram showing a vehicle engine control system including a controller according to a fourth embodiment of the present invention.

Referring to FIG. 8, the vehicle engine control system 301 includes a portable device 311, which is held by a user (driver) of a vehicle 302, and a controller (wireless communication controller) 321, which is installed in the vehicle 302.

The portable device 311, which communicates with the controller 321, includes a receiver circuit 312, a microcomputer 313, a transmitter circuit 314, and a transponder control unit 315.

The receiver circuit 312 receives a request signal from the controller 321 via a receiver antenna 316, demodulates the request signal, and provides the demodulated signal to the microcomputer 313.

When receiving the request signal from the receiver circuit 312, the microcomputer 313 provides the transmitter circuit 314 with an ID code signal, which includes a predetermined ID code.

The transmitter circuit 314 modulates the ID code signal to a radio wave having a predetermined frequency (300 MHz in the fourth embodiment). Then, the transmitter circuit 314 transmits the radio wave out of the portable device 311 via an antenna 317.

When the driver holds the portable device 311 in a second area A2 (refer to FIG. 9), the transponder control unit 315 is energized in a manner sufficient for generating electromotive force. The transponder control unit 315 uses the electromotive force to output a transponder code signal. More specifically, the transponder control unit 315 transmits a transponder code signal having a predetermined frequency (134 kHz in the fourth embodiment) when receiving a transponder drive radio wave from the controller 321.

The controller 321 includes a transmitter circuit 322, a receiver circuit 323, a transceiver circuit 324, and a microcomputer 325.

The transmitter circuit 322, the receiver circuit 323, and the transceiver circuit 324 are connected to the microcomputer 325. A transmitter antenna 322a is connected to the transmitter circuit 322. A receiver antenna 323a is connected to the receiver circuit 323. A transceiver antenna 324a is connected to the transceiver circuit 324.

The transmitter circuit 322 converts a request signal, which is provided from the microcomputer 325, to a radio wave having a predetermined frequency and transmits the radio wave via the transmitter antenna 322a.

The receiver circuit 323 receives the ID code signal from the portable device 311 via the receiver antenna 323a. The receiver circuit 323 modulates the ID code signal to a pulse signal to generate a received signal. Then, the receiver circuit 323 provides the received signal to the microcomputer 325.

The transceiver circuit 324 converts a transponder drive signal, which is provided from the microcomputer 325, to a radio wave having a predetermined frequency to generate a transponder drive radio wave. Then, the transceiver circuit 324 transmits the transponder drive radio wave via the transceiver antenna 324a. Further, when receiving the transponder code signal from the portable device 311, the transceiver circuit 324 demodulates the transponder code signal to a pulse signal to generate a received signal. The transceiver circuit 324 then provides the received signal to the microcomputer 325.

Figure 9:
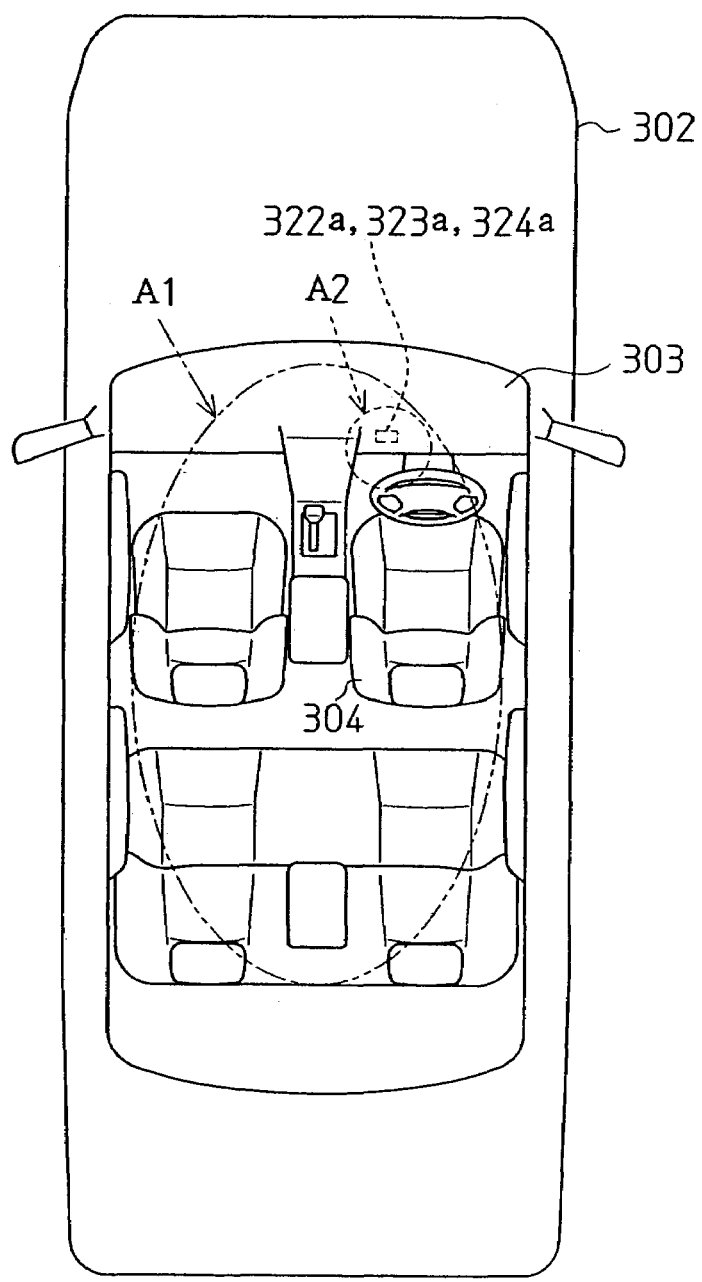
FIG. 9 is a diagram showing a first area and a second area in the fourth embodiment.

Referring to FIG. 9, in the fourth embodiment, the transmitter antenna 322a, the receiver antenna 323a, and the transceiver antenna 324a are arranged in an instrument panel 303 of the vehicle 302 near the driver's seat 304. The request signal is transmitted to a first area A1 in the passenger compartment of the vehicle 302. The transponder drive radio wave is transmitted to the second area A2, which is smaller than the first area A1. The portable device 311 and the controller 321 communicate with each other in the first and second areas A1 and A2. In the fourth embodiment, the frequencies of the request signal and the transponder drive radio wave are set at 134 kHz. The first area A1 is defined by a wide space in the passenger compartment. The second area A2 is defined by a narrow space separated from the transceiver antenna by about 0.1 m.

The microcomputer 325 is electrically connected to an operation switch 331, a mode switch 332, and an engine control unit 333. The microcomputer 325 includes a CPU, a RAM, and a ROM (not shown) in addition to a non-volatile memory 325a and a timer 325b. The microcomputer 325 selectively executes communication control in a first mode and in a second mode.

The memory 325a records a predetermined ID code, a predetermined transponder code, and an execution time setting parameter. Referring to FIG. 10, the execution time setting parameter includes a plurality of execution time setting conditions (first to fifth conditions in the fourth embodiment) corresponding to the measurement value of the timer 325b. Further, the execution time setting parameter includes backup control execution time Te and normal control execution time Ts, which are set in association with each of the execution time setting conditions. The backup control execution time Te refers to the continuous execution time of backup control when the microcomputer 325 is set in the second mode. The normal control execution time Ts refers to the continuous execution time of normal control when the microcomputer 325 is set in the second mode. The timer 325b performs measuring or clears the measurement value (resets the measurement value) in accordance with a command from the microcomputer 325.

The operation switch 331 and the mode switch 332 are arranged near the driver's seat in the passenger compartment. Further, the operation switch 331 and the mode switch 332 may be a push button switch, a rotary switch, or a seesaw switch. In the fourth embodiment, the operation switch 331 and the mode switch 332 are arranged near the transceiver antenna 324a in the second area A2. The operation switch 331 provides the microcomputer 325 with an operation signal when operated.

When receiving a starting signal from the microcomputer 325, the engine control unit 333 executes, for example, fuel injection control and ignition control, to start the engine. The engine control unit 333, which detects the state of the engine based on an ignition pulse and an alternator output, provides the microcomputer 325 with a combustion completion signal when detecting that the engine has been started. The engine is not started unless the microcomputer 325 provides the engine control unit 333 with the starting signal. The microcomputer 325 recognizes that the engine has been started based on whether the combustion completion signal is provided from the engine control unit 333.

The microcomputer 325 selectively executes communication control in a first mode and a second mode. The communication control executed by the microcomputer 325 will now be described in detail.

<1> First Mode

When the engine is not running and the mode switch 332 is not operated, the microcomputer 325 is set in a first mode. The microcomputer 325 executes normal control when set in the first mode. More specifically, the microcomputer 325 intermittently provides the transmitter circuit 322 with the request signal at a predetermined cycle. The transmitter circuit 322 transmits the request signal to the first area A1 in the passenger compartment of the vehicle 302 via the transmitter antenna 322a. In response to the request signal, the portable device 311 transmits the ID code signal. When receiving the ID code signal, the microcomputer 325 compares an ID code that is included in the ID code signal with the ID code recorded in the memory 325a (ID code verification). When the two ID codes match, the microcomputer 325 enables the starting of the engine. That is, the microcomputer 325 functions as an activation enabling control unit for enabling the activation of an activated apparatus (engine in this case) when the ID code of the portable device 311 is verified. When the starting of the engine is enabled and an operation signal is provided from the operation switch 331, the microcomputer 325 provides the engine control unit 333 with the starting signal and starts the engine. Thus, in the first mode, the starting of the engine is enabled when the driver, who is holding the portable device 311, enters the passenger compartment of the vehicle 302. The driver only needs to operate the operation switch 331 to start the engine. That is, the driver may start the engine just by entering the first area A1 while carrying the portable device 311 and operating the operation switch 331.

<2> Second Mode

When the engine is not running and the mode switch 332 is operated, the microcomputer 325 is set in the second mode. The processing performed by the microcomputer 325 in the second mode will now be discussed with reference to the flowchart of FIG. 11.

Referring to FIG. 11, in step S1, the microcomputer 325 first determines whether the second mode has been set. That is, the microcomputer 325 determines whether the mode switch 332 has been operated. When determining that the second mode has been set, that is, when determining that the mode switch 332 has been operated, the microcomputer 325 proceeds to step S2. When determining that the second mode has not been set, the microcomputer 325 proceeds to step S11 and executes communication control in the first mode.

In step S2, the microcomputer 325 determines whether the mode switch 332 has just been operated to switch the first mode to the second mode. When the microcomputer 325 determines that the second mode has just been set, the microcomputer 325 proceeds to step S3 to clear (reset) the measurement value of the timer 325b and start measuring time. When the microcomputer 325 determines that the second mode has not just been set, the microcomputer 325 proceeds to step S12.

In step S12, the microcomputer 325 determines whether the ID code of the portable device 311 matches the ID code recorded in the memory 325a. That is, the microcomputer 325 determines whether the portable device ID code has been verified through communication with the portable device 311. When the two ID codes match, or when the portable device ID code is verified through communication with the portable device during normal control in the second mode, the microcomputer 325 proceeds to step S7 without performing steps S4 to S6. When the two ID codes do not match, the microcomputer 325 proceeds to step S4.

In steps S4 and S5, the microcomputer 325 performs processes to execute backup control in the second mode. More specifically, in step S4, the microcomputer 325 intermittently provides the transponder drive signal to the transceiver circuit 324 in a predetermined cycle. The transceiver circuit 324 transmits the transponder drive radio wave to the second area A2 in the passenger compartment of the vehicle 302 via the transceiver antenna 324a. The portable device 311 transmits the transponder code signal in response to the transponder drive radio wave.

In step S5, the microcomputer 325 receives the transponder code signal and determines whether the transponder code included in the transponder code signal matches the transponder code recorded in the memory 325a. When the two transponder codes match, that is, when the portable device transponder code is verified through backup control, the microcomputer 325 proceeds to step S13. In step S13, the microcomputer 325 enables the starting of the engine and then temporarily ends communication control in the second mode. Thus, when the portable device transponder code is verified, the microcomputer 325 does not perform steps S6 to S10. In step S5, when the transponder code signal is not received or when the two transponder codes do not match, the microcomputer 325 proceeds to step S6.

In step S6, the microcomputer 325 determines whether the continuous execution time of backup control, or the backup control execution time Te, has elapsed from when backup control was started. More specifically, based on the measurement value of the timer 325b and the execution time setting parameter recorded in the memory 325a, the microcomputer 325 determines whether the backup control execution time Te corresponding to the present execution time setting condition has elapsed. Referring to FIG. 10, the first condition (backup control execution time Te is 900 milliseconds and normal control execution time Ts is 100 milliseconds) is set immediately after the mode is switched to the second mode. An execution time setting process (step S10) is performed to determine the execution time setting condition of the microcomputer 325 based on the measurement value of the timer 325b.

When the backup control execution time Te has not elapsed in step S6, the microcomputer 325 performs the process of step S4 again. When the backup control execution time Te has elapsed in step S6, the microcomputer 325 proceeds to step S7.

In steps S7 and S8, the microcomputer 325 performs processes for performing normal control. More specifically, in step S7, the microcomputer 325 intermittently provides the transmitter circuit 322 with the request signal at a predetermined cycle. Then, the transmitter circuit 322 transmits the request signal to the first area A1 via the transmitter antenna 322a. The portable device 311 transmits the ID code signal in response to the request signal.

In step S8, the microcomputer 325 receives the ID code signal and determines whether the ID code included in the ID code signal matches the ID code recorded in the memory 325a. When the two ID codes match, the microcomputer 325 proceeds to step S13 and enables the starting of the engine. Then, the microcomputer 325 temporarily ends communication control in the second mode. When the ID code signal is not received or the two ID codes do not match in step S8, the microcomputer 325 proceeds to step S9.

In step S9, the microcomputer 325 determines whether the continuous execution time of normal control, or the normal control execution time Ts, has elapsed from when normal control was started. More specifically, based on the measurement value of the timer 325b and the execution time setting parameter recorded in the memory 325a, the microcomputer 325 determines whether the normal control execution time Ts corresponding to the present execution time setting condition has elapsed.

When the normal control execution time Ts has not elapsed in step S9, the microcomputer 325 performs the process of step S7 again. When the normal control execution time Ts has elapsed in step S9, the microcomputer 325 proceeds to step S10.

In step S10, the microcomputer 325 determines the ratio between the backup control execution time Te and the normal control execution time Ts (execution time setting process) based on the measurement value of the timer 325b.

More specifically, referring to FIG. 10, when the measurement value of the timer 325b is less than or equal to a first threshold value (in this case, twenty seconds), the first condition is set as the execution time setting condition. Under the first condition, the ratio between the backup control execution time Te and the normal control execution time Ts (execution time ratio) is set at 9:1. More specifically, the backup control execution time Te is set at 900 milliseconds, and the normal control execution time Ts is set at 100 milliseconds.

When the measurement value of the timer 325b is within a range between the first threshold value and a second threshold value (in this case, 40 seconds), the second condition is set as the execution time setting condition. Under the second setting condition, the execution time ratio is set at 7:3. More specifically, the backup control execution time Te is set at 700 milliseconds, and the normal control execution time Ts is set at 300 milliseconds.

When the measurement value of the timer 325b is within a range between the second threshold value and a third threshold value (in this case, 60 seconds), the third condition is set as the execution time setting condition. Under the third setting condition, the execution time ratio is set at 5:5. More specifically, the backup control execution time Te is set at 500 milliseconds, and the normal control execution time Ts is set at 500 milliseconds.

When the measurement value of the timer 325b is within a range between the third threshold value and a fourth threshold value (in this case, 80 seconds), the fourth condition is set as the execution time setting condition. Under the fourth setting condition, the execution time ratio is set at 3:7. More specifically, the backup control execution time Te is set at 300 milliseconds, and the normal control execution time Ts is set at 700 milliseconds.

When the measurement value of the timer 325b is within a range between the fourth threshold value and a fifth threshold value (in this case, 120 seconds), the fifth condition is set as the execution time setting condition. Under the fifth setting condition, the execution time ratio is set at 1:9. More specifically, the backup control execution time Te is set at 100 milliseconds, and the normal control execution time Ts is set at 900 milliseconds.

When the measurement value of the timer 325b exceeds the fifth threshold value, the microcomputer 325 automatically returns to the first mode from the second mode. The microcomputer 325 has the timer 325b stop measuring time when switched to the first mode.

As described above, in the second mode, the microcomputer 325 decreases the ratio of the backup control execution time Te as time elapses. Thus, backup control is given priority immediately after the mode is switched to the second mode, and normal control is given priority as time elapses.

In the fourth embodiment, the first threshold value is set at 20 seconds, the second threshold value is set at 40 seconds, the third threshold value is set at 60 seconds, the fourth threshold value is set at 80 seconds, and the fifth threshold value is set at 120 seconds. Therefore, even if the mode switch 332 is operated to switch the first mode to the second mode, the microcomputer 325 automatically switches to the first mode if 120 seconds elapses when the portable device 311 cannot be verified.

The microcomputer 325 temporarily ends communication control in the second mode after performing the execution time setting process as shown in the flowchart of FIG. 11. The microcomputer 325 repeats communication control in the second mode at a predetermined cycle.

When the battery of the portable device 311 is drained, the driver operates the mode switch 332 to switch the first mode to the second mode. In the second mode, the microcomputer 325 alternately performs backup control and normal control. Thus, as long as the driver holds the portable device 311 in the second area A2, the portable device 311 is verified through communication during backup control. By holding the portable device 311 in the second area A2, the driver enables the starting of the engine. Further, normal control is executed in the second mode. Thus, as long as the portable device 311 normally transmits the ID code signal, the driver carrying the portable device 311 only has to enter the passenger compartment to perform communication between the portable device 311 and the controller 321 in order to verify the portable device 311. This enables the driver to start the engine in the same manner as in the first mode.

The controller 321 of the fourth embodiment has the advantages described below.

(1) Normal control is intermittently performed in the second mode. Thus, even if the driver accidentally switches the microcomputer 325 from the first mode to the second mode, communication is performed between the portable device 311 and the controller 321 during normal control to verify the portable device 311. In other words, communication between the portable device 311 and the controller 321 in normal control is prevented from being disabled when the mode switch 332 is erroneously operated.

(2) In the second mode, the ratio of the backup control execution time Te decreases as time elapses. Thus, during the initial period after the mode is switched to the second mode, the communication response between the portable device 311 and the controller 321 in backup control (backup response) is quick. Then, the communication response between the portable device 311 and the controller 321 in normal control (normal response) becomes quick as time elapses. Normally, the driver intentionally switches the mode to the second mode. Immediately after switching to the second mode, there is a high possibility of communication being performed between the portable device 311 and the controller 321 through backup control. When the portable device 311 is not verified through communication in backup control within a short period after the mode is switched to the second mode, there is a possibility that the driver accidentally switched the mode to the second mode. This increases the necessity to execute normal control. Thus, in the controller 321, the normal control response and backup control response in the second mode is optimal. This improves response for communication between the portable device 311 and the controller 321.

(3) When the portable device 311 is not verified through communication between the portable device 311 and the controller 321 after setting the second mode even when a predetermined time (120 seconds in the fourth embodiment) elapses, the microcomputer 325 is automatically switched from the second mode to the first mode. Thus, the driver does not have to operate the mode switch 332 to switch the microcomputer 325 to the first mode. This improves operability.

(4) In the second mode, after the portable device 311 is verified through communication in the backup control, the microcomputer 325 does not perform steps S6 to S10 of the flowchart illustrated in FIG. 11. In this case, after the portable device 311 is verified through backup control, the microcomputer 325 does not execute normal control. Further, after the portable device 311 is verified through communication in normal control, the microcomputer 325 does not perform steps S4 to S6 of the flowchart illustrated in FIG. 11. In this case, the microcomputer 325 does not execute backup control. This reduces the processing load applied to the microcomputer 325.

It should be apparent to those skilled in the art that the present invention may be embodied in many other specific forms without departing from the spirit or scope of the invention. Particularly, it should be understood that the present invention may be embodied in the following forms.

In the first embodiment, the driver pushes the push button of the engine starting switch 145 only once (normal operation) to start the engine. More specifically, when the starting of the engine is not enabled during normal control, the verification ECU 128 is switched from normal control to backup control when the push button of the engine starting switch 145 is pushed once. However, the verification ECU 128 may be switched from normal control to backup control when a special operation, which differs from the normal operation, is performed on the engine starting switch 145. More specifically, if the engine starting switch 145 is a push button switch, the special operation may be pushing the push button of the engine starting switch 145 for a number of times that is greater than during the normal operation (e.g., three times) within a predetermined time length (e.g., ten seconds). Alternatively, the special operation may be pushing the engine starting switch 145 longer than during the normal operation (e.g., ten seconds).

The push button switch of the second embodiment or the seesaw switch of the third embodiment may be used in lieu of the engine starting switch 145 of the first embodiment.

Figure 12:
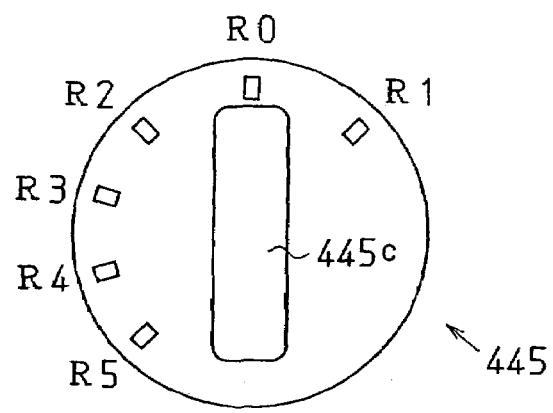
FIG. 12 is a schematic diagram showing an engine starting switch (rotary switch) according to a further embodiment of the present invention.

In the first and second embodiments, the engine starting switch may be a rotary switch 445, which includes a switch knob 445c, as shown in FIG. 12. The driver turns the switch knob 445c of the engine starting switch 445 in a first direction from a home position R0 to an engine starting position R1 (normal operation). The engine starting switch 445 is provided with a return function that returns the switch knob 445c to the home position R0 from the engine starting position R1 when the driver releases the switch knob 445c.

The driver turns the switch knob 445c in a second direction from the home position R0 by one step (special operation) to a backup control position R2, which is related with backup control. Further, the driver turns the switch knob 445c in the second direction from the home position R0 by two to four steps to an accessory position R3, an ignition position R4, and an engine starting position R5, respectively. The engine starting switch 445 is provided with a return function that returns the switch knob 445c to the ignition position R4 from the engine starting position R5 when the driver releases the switch knob 445c.

Figure 13:
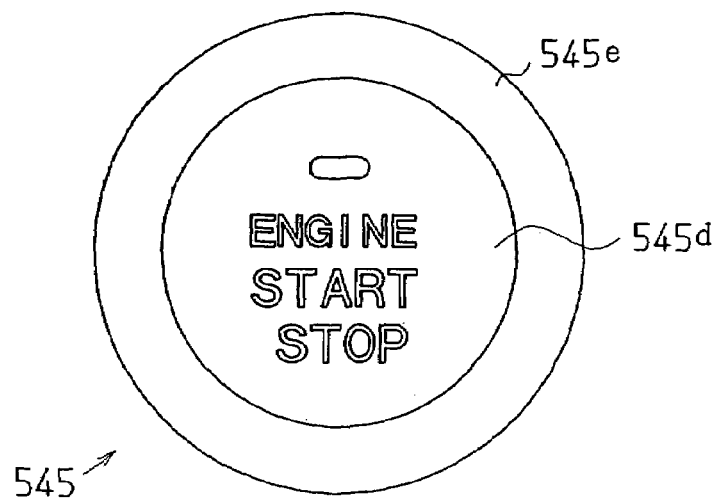
FIG. 13 is a schematic diagram showing an engine starting switch (bezel switch) according to another further embodiment of the present invention.

As shown in FIG. 13, an engine starting switch 545 including a push button 545d and a bezel 545e (ornamental member) encompassing the push button 545d may be used in the first and second embodiments. In this manner, when such a bezel switch is employed as the engine starting switches 145 and 240, special operations may be performed with the bezel 545e. More specifically, special operations include turning the bezel 545e, removing the bezel 545e, and pushing the bezel 545e.

As shown by the broken lines in FIG. 1, in the first embodiment, the remote control system 101 may include a backup switch 150 connected to the verification ECU 128 to switch the communication control from normal control to backup control. In this structure, the verification ECU 128 is switched from normal control to backup control when the backup switch 150 is operated.

Figure 14:
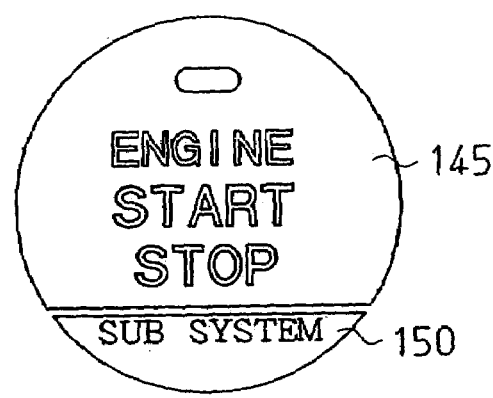
FIG. 14 is a schematic diagram showing the positional relationship between an engine starting switch and a backup switch according to yet another further embodiment of the present invention.

In a structure that includes the backup switch 150, which is separate from the engine starting switch 145, as shown in FIG. 14, the engine starting switch 145 and the backup switch 150 may be arranged near each other so that they define a circular form. In this structure, the driver recognizes that the engine starting switch 145 and the backup switch 150 are closely related with each other. That is, when the engine does not start even though the engine starting switch 145 is operated, the driver recognizes that the backup switch 150 may be operated to start the engine. This structure also improves the aesthetic appearance of the engine starting switch 145 and the backup switch 150.

Figure 15:
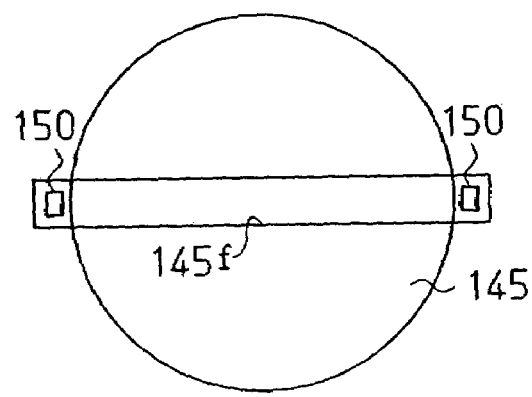
FIG. 15 is a schematic diagram showing an engine starting switch including a guide groove according to still another further embodiment of the present invention.

As shown in FIG. 15, two backup switches 150 may be arranged adjacent to the engine starting switch 145. In this structure, a guide groove 145f extends along and out of the push button of the engine starting switch 145 in the radial direction of the switch 145. The guide groove 145f is shaped in correspondence with the portable device 102 so that one end of the portable device 102 may be received in the guide groove 145f. The driver aligns the portable device 102 with the guide groove 145f to push the push button with the portable device 102. This activates both the engine starting switch 145 and the backup switches 150. Since the guide groove 145f is shaped in correspondence with the portable device 102, this suggests to the driver to push the engine starting switch 145 and the backup switch 150 with the portable device 102. In this structure, the driver simultaneously holds the portable device 102 in the second area A2 and operates the engine starting switch 145. This improves operability when starting the engine even if the smart ignition function is invalid such as when the battery of the portable device 102 is drained.

In the first embodiment, the transmitter antenna 122 for the request signal is separate from the transceiver antenna 127 for the transponder drive radio wave. However, a single antenna functioning as a transmitter antenna for the request signal and a transceiver antenna for the transponder drive radio wave may be used.

In the first embodiment, the controller 103 is used in the remote control system 101, which is provided with the smart ignition function. However, the controller 103 may be used in a remote control system provided with a smart entry function. For example, when the driver believes that the driver's door is unlocked by the smart entry function, the driver pulls the door handle once (normal operation) to open the door. When the driver's door is not unlocked through normal control, the normal operation switches the verification ECU 128 from normal control to backup control.

Further, the verification ECU 128 may be switched from normal control to backup control when a special operation is performed on the door handle. The special operation may be operating the door handle more often (three times) than the normal operation within a predetermined time (e.g., ten seconds) or operating the door handle over a longer period (e.g., ten seconds) than the normal operation.

In the second embodiment, the engine starting switch 240 (push button switch) may be provided with a feel that enables the driver to easily recognize that the engine starting switch 240 has been moved to the engine starting position P1 or the backup control position P2.

In the third embodiment, the engine starting switch 240 (seesaw switch) may be provided with a feel that enables the driver to easily recognize that the engine starting switch 240 has been moved to the engine starting position Q1 or Q5.

In the embodiment of FIG. 12, the engine starting switch 445 (rotary switch) may be provided with a feel that enables the driver to easily recognize that the engine starting switch 445 has been moved to the engine starting position R1 or R5.

In the above embodiments, if the push button 241 (the button 242, the switch knob 445c) is operated when the engine is running and moved from the home position P0 (Q0, R0) to the engine starting position P1 (Q1, R1), the engine may be stopped. That is, the engine starting position P1 (Q1, R1) may also function as an engine stopping position.

In the third embodiment and the embodiment of FIG. 12, if the button 242 (the switch knob 445c) is operated when the engine is running and moved from the ignition position Q4 (R4) to the engine starting position Q5 (R5), the engine may be stopped. That is, the engine starting position Q5 (R5) may also function as an engine stopping position.

It is obvious that the home position P0 (Q0, R0) functions as a normal control position at which normal control is performed.

In the second and third embodiments, when the engine starting switch 240 is switched to the backup control position P2, the verification ECU 226 performs backup control. However, when the engine starting switch 240 is moved to the backup control P2, the verification ECU 226 may perform communication control in the second mode of the fourth embodiment.

In the fourth embodiment, the mode switch 332 may be eliminated. In this case, the switching from the first mode to the second mode may be performed in the same manner as the switching from normal control to backup control as performed in the first embodiment and the embodiments shown in FIGS. 12 and 13. For example, if the starting of the engine is not enabled through communication control in the first mode, the microcomputer 325 may switch to the second mode when the operation switch 331 is operated.

In the fourth embodiment, instead of the operation switch 331, the engine starting switch 240 may be connected to the microcomputer 323. In this case, the microcomputer 323 may be set in the second mode when the engine starting switch 240 is moved to the backup position Q2.

In the fourth embodiment, the microcomputer 325 is set in five execution time setting conditions, that is, the first to fifth conditions. However, the microcomputer 325 is not limited to the five execution time setting conditions and may be set in, for example, two to four conditions or six or more conditions.

In the fourth embodiment, the microcomputer 325 switches from the first mode to the second mode when the mode switch 332 is operated. However, the mode switch 332 may be eliminated and the microcomputer 325 may be switched from the first mode to the second mode when the operation switch 331 undergoes a predetermined operation. The predetermined operation may be the operation switch 331 being operated three times or the operation switch 331 being operated when the portable device 311 and the controller 321 are not communicating with each other.

In the fourth embodiment, a holder for receiving the portable device 311 may be arranged in the second area A2 of passenger compartment of the vehicle 302. In this structure, the mode switch 332 may be a switch or sensor for detecting whether the portable device 311 is received in the holder.

In the fourth embodiment, the ratio (execution time ratio) between the backup control execution time Te and the normal control execution time Ts in the second mode changes as time elapses. However, the values of the execution times Te and Ts may be changed without changing the execution time ratio. For example, the execution time ratio may be fixed at 5:5 and the initial value of each of the execution times Te and Ts may first be set at 500 milliseconds. In this case, the values of the execution times Te and Ts is decreased as time elapses, for example, from 500 milliseconds to 400 milliseconds and then to 300 milliseconds. Alternatively, the values of the execution times Te and Ts may be increased as time elapses, for example, from 500 milliseconds to 600 milliseconds and then to 700 milliseconds. As another option, in addition to the execution time ratio, the execution times Te and Ts may be fixed.

In the fourth embodiment, the ratio of the normal control execution time Ts relative to the backup control execution time Te increases as time elapses. However, the ratio of the normal control execution time Ts relative to the backup control execution time Te may, for example, decrease as time elapses or increase and then decrease as time elapses. Further, the controller 321 may be configured so that the driver can adjust the ratio.

The microcomputer 325 of the fourth embodiment executes only backup control after portable device verification is performed through backup control in the second mode. Further, the microcomputer 325 executes only normal control after portable device verification is performed through normal control in the second mode. However, after portable device verification is performed in the second mode, backup control and normal control may be alternately executed.

The microcomputer 325 of the fourth embodiment automatically returns to the first mode from the second mode when portable device verification cannot be performed before the predetermined time (fifth threshold value) elapses from when the second mode is set. However, the microcomputer 325 does not have to automatically return to the first mode from the second mode in this manner.

In the fourth embodiment, the controller 321 executes control for enabling the starting of the engine. In addition to the engine starting enabling control, the controller 321 may execute a control for locking or unlocking a door. The controller 321 may perform both engine starting enabling control and door locking control. Further, the controller 321 may also be applied to, for example, a door of a house to lock and unlock the door. When the controller 321 is used as a door lock controller, the controller 321 may be switched from the first mode to the second mode if, for example, the door handle is operated when the door is locked or if the door handle is operated in a predetermined manner (e.g., the door handle is operated three times within a predetermined time).

The present examples and embodiments are to be considered as illustrative and not restrictive, and the invention is not to be limited to the details given herein, but may be modified within the scope and equivalence of the appended claims.

What is claimed is:

1. A controller for communication with a portable device and connection to an activated apparatus and to an operation unit operable by a user to activate the activated apparatus, the controller comprising:
a control unit that selectively performs normal control and backup control, wherein the normal control includes transmission of a request signal to a first area, and wherein the backup control includes transmission of a drive radio wave to a second area, the portable device transmitting an ID code in response to the request signal or the drive radio wave, and the control unit enabling activation of the activated apparatus when the ID code transmitted from the portable device matches an ID code of the controller, wherein the control unit transmits the drive radio wave in response to a state in which activation of the activated apparatus has failed to be enabled after transmission of the request signal when the operation unit undergoes an operation that is normally performed by a user presuming that the activated apparatus has been enabled through the normal control of the control unit.

2. The controller according to claim 1, wherein the control unit transmits the request signal after a predetermined time elapses from when starting to transmit the drive radio wave.

3. The controller according to claim 1, wherein the control unit alternately transmits the request signal and the drive radio wave when transmitting the radio drive wave.

4. The controller according to claim 3, wherein the control unit transmits only the request signal after the activation of the activated apparatus is enabled when the portable device transmits the ID code in response to the request signal, and the control unit transmits only the drive radio wave after the activation of the activated apparatus is enabled when the portable device transmits the ID code in response to the drive radio wave.

5. The controller according to claim 3, wherein the control unit transmits only the request signal after a predetermined time elapses from when starting to alternately transmit the request signal and the drive radio wave.

6. The controller according to claim 3, wherein the control unit alternately transmits the request signal for a first time length and the radio drive wave for a second time length, the control unit changing the first time length during which the request signal is transmitted and the second time length during which the radio drive wave is transmitted in accordance with the time elapsed from when starting to transmit the radio drive wave.

7. The controller according to claim 6, wherein the control unit increases the ration of the first time length relative to the second time length in accordance with the time elapsed from when starting to transmit the radio drive wave.

8. The controller according to claim 6, further comprising:
a memory for storing a plurality of different conditions indicating combinations of the first time length and the second time length, the control unit changing the first time length and the second time length by selecting one of the conditions in accordance with the time elapsed from when starting to transmit the drive radio wave.

9. A controller for communication with a portable device and connection to an activated apparatus and to an operation unit operable by a user to activate the activated apparatus, the controller comprising:
a control unit that selectively performs normal control and backup control, wherein the normal control includes transmission of a request signal to a first area, and wherein the backup control includes transmission of a drive radio wave to a second area, the portable device transmitting an ID code in response to the request signal or the drive radio wave, and the control unit enabling activation of the activated apparatus when the ID code transmitted from the portable device matches an ID code of the controller, wherein the control unit initiates the backup control when a special operation, which is different than the operation to activate the activated apparatus, is performed on the operation unit.

10. A controller for communication with a portable device and connection to an activated apparatus and to an operation unit operable by a user to activate the activated apparatus, the controller comprising:
a control unit that selectively performs normal control and backup control, wherein the normal control includes transmission of a request signal to a first area, and wherein the backup control includes transmission of a drive radio wave to a second area, the portable device transmitting an ID code in response to the request signal or the drive radio wave, and the control unit enabling activation of the activated apparatus when the ID code transmitted from the portable device matches an ID code of the controller, wherein the control unit is connected to at least one user-operable switch that is separate from, and situated adjacent the operation unit and used to select between the normal control and the backup control.

11. An engine start switch connectable to a controller of an activated apparatus and used by a user to activate the activated apparatus, wherein the controller communicates with a portable device, transmits a request signal to a first area, and transmits a drive radio wave to a second area, and the portable device transmits an ID code in response to the request signal of the drive radio wave, the controller enabling activation of the activated apparatus when the ID code transmitted from the portable device matches an ID code of the controller, the engine start switch comprising:
an operated member operable by the user and moved from a home position to a first switch position for activating the activated apparatus and moved from the home position to a second switch position for transmitting the drive radio wave from the controller.

12. The switch according to claim 11, wherein the operated member is pushed by the user, moved to the first switch position from the home position when pushed in a first stroke by the user, and moved to the second switch position from the home position when pushed by the user in a second stroke longer than the first stroke.

13. The switch according to claim 12, wherein the operated member returns to the home position from the first switch position or the second switch position when the user releases the operated member after pushing the operated member.

14. The switch according to claim 11, wherein the operated member is moved in a first direction to the first switch position by the user and moved in a second direction, which differs from the first direction, to the second switch position by the user.

15. The switch according to claim 14, wherein the operated member returns to the home position from the first switch position or the second switch position when the user releases the operated member after operating the operated member.

16. The switch according to claim 15, wherein the operated member is moved from the second switch position in the second direction to a third switch position to activate the activated apparatus.

17. A control system for controlling an activated apparatus by communicating with a portable device of a user, the system comprising:
a controller for communicating with the portable device, transmitting a request signal to a first area, and transmitting a drive radio wave to a second area, wherein the portable device transmits an ID code in response to the request signal or the drive radio wave, the controller enabling activation of the activated apparatus when the ID code transmitted from the portable device matches an ID code of the controller; and
a switch connected to the controller, the switch including an operated member operated by the user to activate the activated apparatus, wherein the operated member is operated by the user and moved from a home position to a first switch position and from the home position to a second switch position, the controller activating the activated apparatus if activation is enabled when the operated member is located at the first switch position, and the controller transmitting the drive radio wave when the operated member is located at the second switch position.

18. The system according to claim 17, wherein the controller alternately transmits the request signal and the radio drive wave when transmitting the radio drive wave.

19. The system according to claim 18, wherein the controller transmits only the request signal after the activation of the activated apparatus is enabled when the portable device transmits the ID code in response to the request signal, and the controller transmits only the drive radio wave after the activation of the activated device is enabled when the portable device transmits the ID code in response to the drive radio wave.

20. The system according to claim 18, wherein the controller transmits only the request signal after a predetermined time elapses from when starting to alternately transmit the request signal and the radio drive wave.

21. The system according to claim 18, wherein the controller alternately transmits the request signal for a first time length and the radio drive wave for a second time length, the controller changing the first time length during which the request signal is transmitted and the second time length during which the radio drive wave is transmitted in accordance with the time elapsed from when starting to transmit the radio drive wave.

22. The system according to claim 21, wherein the controller increases the ratio of the first time length relative to the second time length in accordance with the time elapsed from when starting to transmit the radio drive wave.

23. The system according to claim 21, further comprising:
a memory for storing a plurality of different conditions indicating combinations of the first time length and the second time length, the controller changing the first time length and the second time length by selecting one of the conditions in accordance with the time elapsed from when starting to transmit the drive radio wave.

24. A method for activating an activated apparatus with a portable device, which transmits a first code in response to a request signal and a second code in response to a drive radio wave, and an operation unit, which is operated by a user, the method comprising:
transmitting the request signal to a first area;
comparing the first code, transmitted by the portable device in response to the request signal, with a third code;
enabling the activation of the activated apparatus when the first code and the third code match;
transmitting the drive radio wave to a second area when the first code and the third code do not match and the operation unit undergoes an operation performed by the user;
comparing the second code, transmitted by the portable device in response to the drive radio wave, with a fourth code; and
enabling the activation of the activated apparatus when the second code and the fourth code match.

25. The method according to claim 24, wherein the operation that the operation unit undergoes includes an operation performed to activate the activated apparatus.

26. The method according to claim 24, wherein the operation that the operation unit undergoes includes an operation differing from an operation performed to activate the activated apparatus.

27. The method according to claim 24, wherein the operation that the operation unit undergoes includes an operation performed a plurality of times to activate the activated apparatus.

28. The method according to claim 24, further comprising:
transmitting the request signal after a predetermined time elapses from when starting to transmit the drive radio wave.

29. The method according to claim 24, wherein said transmitting the drive radio wave includes alternately transmitting the request signal and the drive radio wave.

30. The method according to claim 29, further comprising:
transmitting only the request signal after the first code and the third code match; and
transmitting only the drive radio wave after the second code and the fourth code match.

31. The method according to claim 30, wherein said transmitting the drive radio wave includes alternately transmitting the request signal for a first time length and the radio drive wave for a second time length, and changing the first time length during which the request signal is transmitted and the second time length during which the radio drive wave is transmitted in accordance with the time elapsed from when starting to transmit the radio drive wave.

32. The system according to claim 31, wherein said changing the first time length during which the request signal is transmitted and the second time length during which the radio drive wave is transmitted includes increasing the ratio of the first time length relative to the second time length in accordance with the time elapsed from when starting to transmit the radio drive wave.

* * * * *

UNITED STATES PATENT AND TRADEMARK OFFICE
CERTIFICATE OF CORRECTION

PATENT NO. : 7,199,710 B2
APPLICATION NO. : 10/858843
DATED : April 3, 2007
INVENTOR(S) : Takayuki Hiramitsu et al.

Page 1 of 1

It is certified that error appears in the above-identified patent and that said Letters Patent is hereby corrected as shown below:

On the Title page, item (73) Assignees:

Delete "Kabushiki Kaisha Tokai Rika Denki" and insert --Kabushiki Kaisha Tokai Rika Denki Seisakusho--; and delete "Seisakusho & Toyota Jidosha Kabushiki" and insert --Toyota Jidosha Kabushiki--.

Signed and Sealed this
Fourth Day of June, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 7,199,710 B2
APPLICATION NO. : 10/858843
DATED : April 3, 2007
INVENTOR(S) : Takayuki Hiramitsu et al.

It is certified that error appears in the above-identified patent and that said Letters Patent is hereby corrected as shown below:

On the title page, item (73) Assignees:

Delete "Kabushiki Kaisha Tokai Rika Denki Achi (JP)" and insert --Kabushiki Kaisha Tokai Rika Denki Seisakusho, Aichi (JP)--; and delete "Seisakusho & Toyota Jidosha Kabushiki" and insert --Toyota Jidosha Kabushiki Kaisha, Toyota-Cho, Toyota-Shi, Aichi-Ken, Japan--

Signed and Sealed this
Third Day of September, 2013

Teresa Stanek Rea
*Acting Director of the United States Patent and Trademark Office*